United States Patent
Kim et al.

(10) Patent No.: US 9,572,096 B2
(45) Date of Patent: Feb. 14, 2017

(54) METHOD AND APPARATUS FOR REMOTE-ACCESSING IN WIRELESS COMMUNICATION SYSTEM

(75) Inventors: Hyunsook Kim, Anyang-si (KR); Laeyoung Kim, Anyang-si (KR); Taehyeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 14/234,887

(22) PCT Filed: Sep. 7, 2012

(86) PCT No.: PCT/KR2012/007238
§ 371 (c)(1),
(2), (4) Date: Jan. 24, 2014

(87) PCT Pub. No.: WO2013/036080
PCT Pub. Date: Mar. 14, 2013

(65) Prior Publication Data
US 2014/0153496 A1    Jun. 5, 2014

Related U.S. Application Data

(60) Provisional application No. 61/532,063, filed on Sep. 7, 2011, provisional application No. 61/532,112, filed on Sep. 8, 2011, provisional application No. 61/532,563, filed on Sep. 9, 2011, provisional application No. 61/616,422, filed on Mar. 28, 2012,
(Continued)

(51) Int. Cl.
*H04W 48/20* (2009.01)
*H04W 76/02* (2009.01)
*H04W 48/00* (2009.01)

(52) U.S. Cl.
CPC ............. *H04W 48/20* (2013.01); *H04W 48/17* (2013.01); *H04W 76/021* (2013.01)

(58) Field of Classification Search
None
See application file for complete search history.

(56) References Cited

U.S. PATENT DOCUMENTS 8,270,978 B1 *   9/2012   Faccin et al. ................. 455/438
2011/0171953 A1 *   7/2011   Faccin et al. ............. 455/426.1

FOREIGN PATENT DOCUMENTS

WO      WO 2010/123643 A1    10/2010
WO      WO 2010123643 A1 *   10/2010
(Continued)

*Primary Examiner* — Hassan Kizou
*Assistant Examiner* — Hashim Bhatti
(74) *Attorney, Agent, or Firm* — Birch, Stewart, Kolasch & Birch, LLP

(57) ABSTRACT

The present invention relates to a wireless communication system, and more specifically, a method and an apparatus for remote-accessing are disclosed. A method for transmitting remote access indication information, according to one embodiment of the present invention, comprises the steps of: generating from a first network node remote access packet data network (PDN) connection indication information with respect to PDN connection of a user equipment (UE); and transmitting the remote access PDN connection indication information from the first network node to the UE, wherein the remote access PDN connection indication information can express whether the PDN connection of the UE is the remote access PDN connection.

18 Claims, 14 Drawing Sheets

Related U.S. Application Data provisional application No. 61/616,431, filed on Mar. 28, 2012, provisional application No. 61/664,131, filed on Jun. 25, 2012.

(56) References Cited

FOREIGN PATENT DOCUMENTS

| WO | WO 2011/085370 A2 | 7/2011 |
|----|-------------------|--------|
| WO | WO 2011/098249 A2 | 8/2011 |

* cited by examiner (a)

(b)

(a)

(b)

(c)

(a)

(b)

METHOD AND APPARATUS FOR REMOTE-ACCESSING IN WIRELESS COMMUNICATION SYSTEM

CROSS REFERENCE TO RELATED APPLICATIONS

This application is the National Phase of PCT/KR2012/007238 filed on Sep. 7, 2012, which claims priority under 35 U.S.C. §119(e) to U.S. Provisional Application No. 61/532,063 filed on Sep. 7, 2011, U.S. Provisional Application No. 61/532,112 filed on Sep. 8, 2011, U.S. Provisional Application No. 61/532,563 filed on Sep. 9, 2011, U.S. Provisional Application No. 61/616,422 filed on Mar. 28, 2012, U.S. Provisional Application No. 61/616,431 filed on Mar. 28, 2012, and U.S. Provisional Application No. 61/664,131 filed on Jun. 25, 2012, all of which are hereby expressly incorporated by reference into the present application.

TECHNICAL FIELD

Embodiments of the present invention relate to a wireless communication system, and more particularly to a method and apparatus for remote access.

BACKGROUND ART

A wireless communication system may include a macro cell for providing wide coverage with high transmit (Tx) power and a micro cell for providing small coverage with lower Tx power than the macro cell. The micro cell may be referred to as a pico cell, a femto cell, a Home NodeB (HNB), or a Home evolved-NodeB (HeNB). The micro cell may be installed, for example, in a shade region not covered by the macro cell. A user may access a local network, the public Internet, a private service provision network, etc. through the micro cell.

The micro cell may be classified into a first-type micro cell and a second-type micro cell according to whether or not user access is limited. The first-type micro cell is a Closed Subscriber Group (CSG) micro cell, and the second-type micro cell is an Open Access (OA) or Open Subscriber Group (OSG) micro cell. Only authorized users can access the CSG micro cell, and all users can access the OSG micro cell without limitation. In addition, a hybrid-access-type micro cell can provide CSG services to a user having a CSG ID, and a subscriber not contained in a CSG can also access the hybrid-access-type micro cell, but the CSG services may not be provided to the subscriber not contained in the CSG.

DISCLOSURE

Technical Problem

In an evolved wireless communication system, many developers and companies are conducting intensive research into a method for introducing various features, such as Local Internet Protocol (IP) Access (LIPA), Managed Remote Access (MRA), and Selected IP Traffic Offload at Local Network (SIPTO@LN), into the evolved wireless communication system through a micro cell. LIPA can support an IP capable UE (i.e., a UE having an IP function) which can access an entity having a different IP function in the same residential-or enterprise-IP network via an H(e)NB. LIPA traffic does not pass through an operator network. SIPTO can support user traffic of the operator (or enterprise) so that the user traffic is offloaded to a specific packet data gateway node.

SIPTO@LN may represent that user traffic is offloaded (handed over) to a local network of a user. Unlike LIPA for providing access to resources of the local network, SIPTO@LN can provide access to an external network (e.g., the Internet) via the local network. MRA can support remote access of an IP capable entity for enabling a CSG user to be connected to a home network from a remote site.

Although introduction of the above-mentioned new characteristics has been intensively discussed in the wireless communication system, a detailed implementation method thereof is yet to be proposed.

An object of the present invention is to provide a method for indicating whether or not MRA is allowed. Another object of the present invention is to provide an indication method for providing distinction between PDN connection (e.g., MRA type connection) via a specific HeNB and other connection type. Another object of the present invention is to provide a method for selecting a correct gateway node for a Managed Remote Access (MRA) operation.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting remote access indication information comprising: generating remote access PDN connection indication information regarding Packet Data Network (PDN) connection of a user equipment (UE) in a first network node; and transmitting the remote access PDN connection indication information from the first network node to the UE, wherein the remote access SIPTO PDN connection indication information indicates whether the UE PDN connection is a remote access PDN connection.

In another aspect of the present invention, a method for receiving remote access indication information, comprising: receiving remote access Packet Data Network (PDN) connection indication information indicating whether a PDN connection of a user equipment (UE) is a remote access PDN connection from a first network node, wherein the remote access PDN connection indication information is generated in the first network node.

In another aspect of the present invention, an apparatus for transmitting remote access indication information, comprising: a transceiver module configured to transmit or receive a signal to or from an external part; a processor configured to control the transceiver module, wherein the processor is configured to generate remote access indication information regarding Packet Data Network (PDN) connection of a user equipment (UE), and is configured to transmit the remote access PDN connection indication information to the UE through the transceiver module, wherein the remote access PDN connection indication information indicates whether the UE PDN connection is a remote access PDN connection.

In another aspect of the present invention, an apparatus for receiving remote access indication information, comprising: a transceiver module configured to transmit or receive a signal to or from an external part; a processor configured to control the transceiver module, wherein the processor is configured to receive remote access Packet Data Network (PDN) connection indication information indicating whether a PDN connection of a user equipment (UE) is a remote access PDN connection from a first network node through the transceiver module, wherein the remote access PDN connection indication information is generated in the first network node.

The following description may be commonly applied to the embodiments of the present invention.

The remote access PDN connection indication information may further include information on at least one of a type of remote access PDN connection or a type of a handover of the UE.

The remote access PDN connection indication information may be defined as charging-related information for identifying the remote access PDN connection.

The method may further comprise transmitting the remote access PDN connection indication information from the first network node to a PDN gateway node through a serving gateway node.

Through the PDN gateway node, a charging system applied to the remote access PDN connection may be determined on the basis of the remote access PDN connection indication information.

The remote access PDN connection indication information transmitted to the UE may be defined as specific information indicating a connectivity type selected for the PDN connection of the UE.

Whether a data session of the PDN connection of the UE is maintained during a handover of the UE may be determined on the basis of the remote access PDN connection indication information.

Information on whether the remote access for the UE is permitted may be provided to the first network node by a database.

The information on whether the remote access is permitted may be defined based on at least one of a network in which a subscriber is located, the UE is located, or a target network of the remote access.

Whether the remote access is permitted may be defined according to whether LIPA(Local Internet Protocol Access) is permitted.

The database may be a network node for storing and managing at least one of subscriber information of the UE, Closed Subscriber Group (CSG) information, or group information for Managed Remote Access (MRA); and the information on whether the remote access is permitted may be contained in at least one of the subscriber information, the CSG information, or the MRA group information.

The first network node may be a Mobility Management Entity (MME).

It is to be understood that both the foregoing general description and the following detailed description of the present invention are exemplary and explanatory and are intended to provide further explanation of the invention as claimed.

Advantageous Effects

As is apparent from the above description, the embodiments of the present invention can provide a detailed implementation method of items requisite for correctly and efficiently performing and supporting new operations such as MRA and SIPTO@LN. For example, the embodiments can provide a method for indicating whether MRA is allowed. In addition, the embodiments can provide an indication method for providing distinction between PDN connection (e.g., MRA type connection) via a specific HeNB and other connection type. The embodiment can provide a method for selecting a correct gateway node for MRA.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
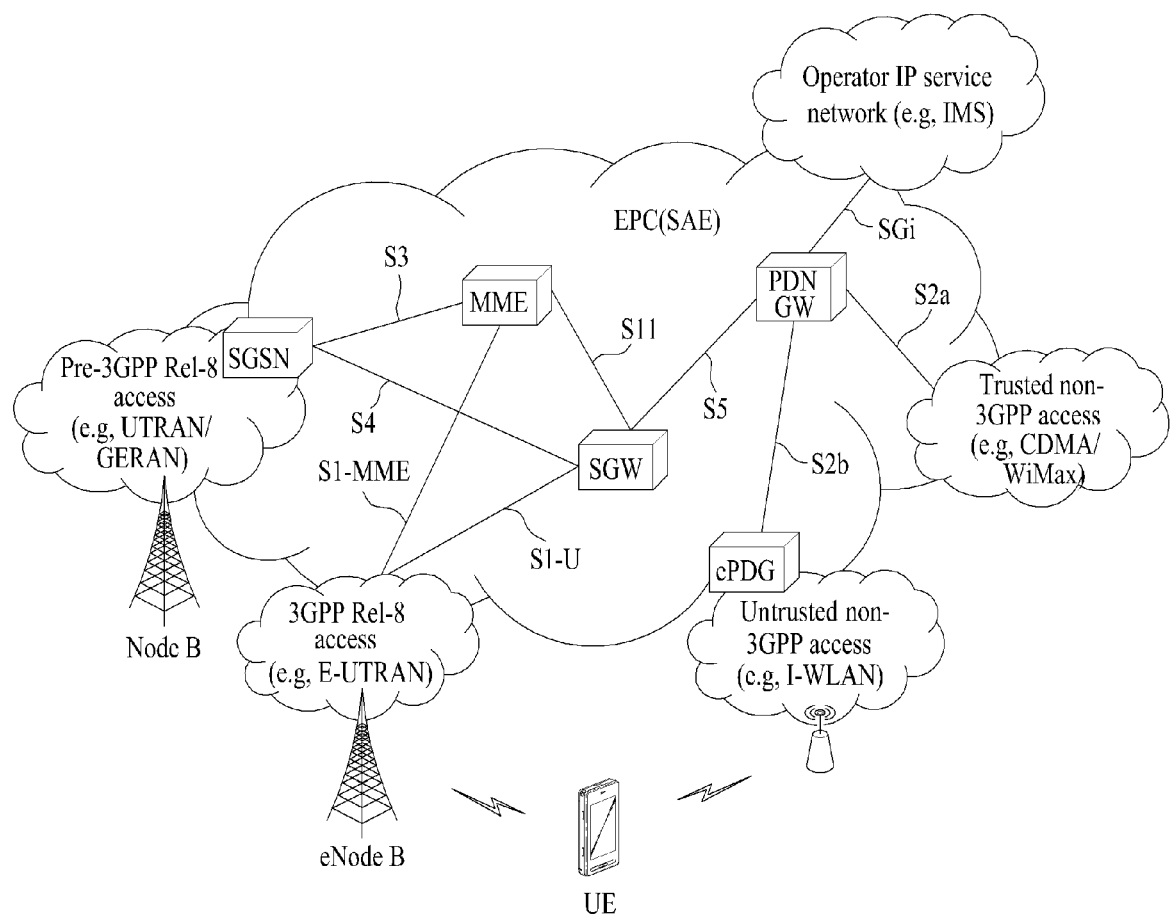
FIG. 1 is a conceptual diagram illustrating an evolved packet system (EPS) including an evolved packet core (EPC).

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless communication systems. For clarity, the following description focuses on 3GPP LTE and 3GPP LTE-A systems. However, technical features of the present invention are not limited thereto.

Terms used in the following description are defined as follows.

Universal Mobile Telecommunications System (UMTS): UMTS refers to a GSM (Global System for Mobile Communication)-based third generation mobile communication technology developed by the 3GPP.

Evolved Packet System (EPS): EPS refers to a network system including not only an Evolved Packet Core (EPC) serving as an IP-based packet switched core network (CN), but also an access network such as LTE, UTRAN, etc. EPC refers to a network evolved from UMTS.

NodeB: NodeB refers to a base station (BS) of GERAN/UTRAN, which is installed outdoors and has a coverage corresponding to a macro cell.

eNodeB: eNodeB refers to a base station of LTE, which is installed outdoors and has a coverage corresponding to a macro cell.

User Equipment (UE): UE may be referred to as a terminal, a Mobile Equipment (ME), or a Mobile Station (MS), etc. The UE may be a type of portable equipment having a communication function, such as a laptop, a cellular phone, a Personal Digital Assistant (PDA), a smart phone, and a multimedia device, or may be a type of fixed equipment, such as a Personal Computer (PC) or a vehicle-mounted device.

Radio Access Network (RAN): Radio access network (RAN) is a unit including a NodeB, an eNodeB, and a Radio Network Controller (RNC) configured to control the NodeB and eNodeB. RAN is present between a UE and a core network and provides connection to the core network (CN).

Home Location Register (HLR)/Home Subscriber Server (HSS): HLR/HSS is a database including subscriber information of the 3GPP network. HSS may perform various functions, for example, configuration storage, identity management, user state storage, etc.

RAN Application Part (RANAP): RANAP is an interface between nodes (i.e., MME (Mobility Management Entity)/SGSN (Serving GPRS (General Packet Radio Service) Support Node)/MSC (Mobile Switching Center)) configured to control a radio access network (RAN) and a core network (CN).

Public Land Mobile Network (PLMN): PLMN is a network configured to provide a mobile communication service to users. PLMN may be classified according to individual operators.

Non-Access Stratum (NAS): NAS is a functional layer for signaling between a UE and a core network and exchanging a traffic message in a UMTS protocol stack, supports UE mobility, and supports a session management procedure for establishing and maintaining an IP connection between a UE and a PDN GW.

Home NodeB (HNB): HNB is a Customer Premises Equipment (CPE) for providing UMTS Terrestrial Radio Access Network (UTRAN) coverage and, for a detailed description thereof, reference may be made to standard specification TS 25.467.

Home eNodeB (HeNB): HeNB is Customer Premises Equipment (CPE) for providing Evolved-UTRAN (E-UTRAN) coverage and, for a detailed description thereof, reference may be made to standard specification TS 36.300.

Closed Subscriber Group (CSG): CSG is a CSG constituent element of H(e)NB, and is a subscriber group for accessing one or more CSG cells of a Public Land Mobile Network (PLMN).

CSG ID: CSG ID is a unique ID for identifying a CSG within a PLMN range associated with a CSG cell or a CSG cell group and, for a detailed description thereof, reference may be made to standard specification TS 23.003.

Local IP Access (LIPA): LIPA can enable an IP capable UE (i.e., a UE having an IP function) to access an entity having a different IP function in the same residential-or enterprise-IP network via H(e)NB. LIPA traffic does not pass through an operator network. In the 3GPP Release-19 system, LIPA can provide access to resources of a local network (i.e., a network located in the home or office of a customer) via H(e)NB.

Managed Remote Access (MRA): MRA can access an IP capable entity for enabling a CSG user to connect to a home network from a remote site. For example, when using MRA, a user located at an external part of the local network can receive user data services from the corresponding local network.

Selected IP Traffic Offload (SIPTO): In 3GPP Release-10, the operator or enterprise selects a Packet data network GateWay (PGW) located physically close to a UE in the EPC network so that offloading of user traffic is supported.

SIPTO@LN (SIPTO at Local Network): SIPTO@LN is an evolved technology of SIPTO of 3GPP Release-10. SIPTO@LN indicates that user traffic is offloaded (handed over) through a local network located in customer coverage. Unlike LIPA for providing access to resources of the local network, SIPTO@LN can provide access to an external network (e.g., the Internet) via the local network. SIPTO@LN operates on the assumption that the local network is connected to a desired external network.

Packet Data Network (PDN) connection: PDN connection refers to logical connection between a UE denoted by one IP address (one IPv4 address and/or one IPv6 prefix) and a PDN denoted by Access Point Name (APN).

LIPA PDN connection: PDN connection for LIPA of a UE connected to H(e)NB.

LIPA-Permission: LIPA-Permission indicates whether APN is accessible through LIPA, and three values are defined as follows:

LIPA-Prohibited: LIPA-Prohibited may prevent the corresponding APN from being accessed through LIPA. That is, user plane data can be accessed through EPC only.

LIPA-Only: LIPA-Only may enable the corresponding APN to be accessed through LIPA only.

LIPA-Conditional: LIPA-Conditional may enable the corresponding APN to be accessed through the LIPA-Prohibited (or non-LIPA) scheme (i.e., through EPC) or the LIPA scheme.

Hereinafter, a description will be given based on the above-described terms.

Evolved Packet Core (EPC)

FIG. 1 is a conceptual diagram illustrating an evolved packet system (EPS) including an evolved packet core (EPC).

The EPC is a fundamental element of system architecture evolution (SAE) for improving 3GPP performance. SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In the existing mobile communication system (that is, a second or third generation mobile communication system), a core network function was implemented through two distinct sub-domains of a voice network (a circuit-switched (CS) network) and a data network (a packet-switched (PS) network). In a 3GPP LTE system which is evolved from the third generation communication system, sub-domains of a CS network and a PS network were unified into one IP domain. That is, in a 3GPP LTE system, connection between UEs having IP capability may be achieved through an IP based base station (e.g., an eNodeB (evolved Node B)), an EPC, an application domain (e.g., an IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) (SGSN) support node and an enhanced packet data gateway (ePDG).

The SGW operates as a boundary point between a radio access network (RAN) and a core network and is an element which performs a function for maintaining a data path between an eNodeB and a PDN GW. In addition, if a UE moves over a region served by an eNodeB, the SGW serves as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (an RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an untrusted network such as an interworking wireless local area network (I-WLAN) and a trusted network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions in order to support access to network connection of a UE, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., GPRS networks).

The ePDG serves as a security node for a non-3GPP network (e.g., an I-WLAN, a Wi-Fi hotspot, etc.).

As described with reference to FIG. 1, a UE having IP capabilities may access an IP service network (e.g., an IMS) provided by an operator through various elements in the EPC based on 3GPP access or non-3GPP access.

FIG. 1 shows various reference points (e.g., S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network structure.

TABLE 1

| Reference point | Description |
| --- | --- |
| S1-MME | Reference point for the control plane protocol between E-UTRAN and MME |
| S1-U | Reference point between E-UTRAN and Serving GW for per bearer user plane tunneling and inter eNodeB path switching during handover |
| S3 | Reference point between MME and SGSN. Enables user and bearer information exchange for inter 3GPP access network mobility in idle and/or active state. This reference point can be used for intra-PLMN or inter-PLMN handover (e.g. in the case of Inter-PLMN HO). |
| S4 | Reference between SGW and SGSN. Provides related control and mobility support between GPRS Core and the 3GPP Anchor function of Serving GW. In addition, if Direct Tunnel is not established, it provides user plane tunneling. |
| S5 | Reference point for providing user plane tunneling and tunnel management between Serving GW and PDN GW. Used for Serving GW relocation due to UE mobility and if the Serving GW needs to connect to a non-co-located PDN GW for the required PDN connectivity. |
| S11 | Reference point between MME and SGW |
| SGi | Reference point between the PDN GW and the packet data network. Packet data network may be an operator external |

TABLE 1-continued

| Reference point | Description |
| --- | --- |
| | public or private packet data network or an intra operator packet data network, e.g. for provision of IMS services. This reference point corresponds to Gi for 3GPP access. |

Among the reference points shown in FIG. 1, S2a and S2b correspond to a non-3GPP interface. S2a is a reference point for providing associated control between the trusted non-3GPP access and the PDNGW and mobility support to a user plane. S2b is a reference point for providing associated control between the ePDG and the PDNGW and mobility support to a user plane.

FIG. 2(a) is a conceptual diagram illustrating an EPS structure for non-roaming, and FIG. 2(b) is a conceptual diagram illustrating an EPS structure for roaming FIGS. 2(a) and 2(b) illustrate an HSS entity and a Policy and a Charging Rules Function (PCRF) entity not shown in FIG. 1. The HSS entity is a database (DB) including subscriber information of the 3GPP network. The PCRF entity is an entity for controlling a policy and a Quality of Service (QoS) of the 3GPP network.

Figure 2:
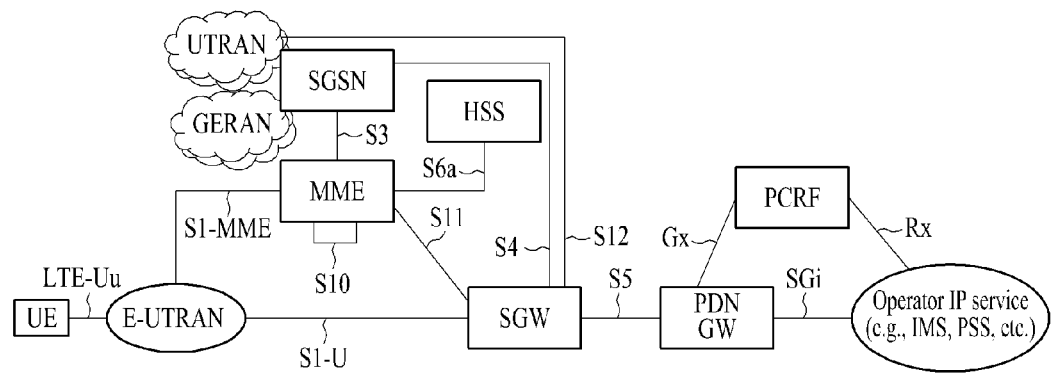
FIG. 2(a) is a conceptual diagram illustrating an EPS structure for non-roaming.
FIG. 2(b) is a conceptual diagram illustrating an EPS structure for roaming
Figure 2:
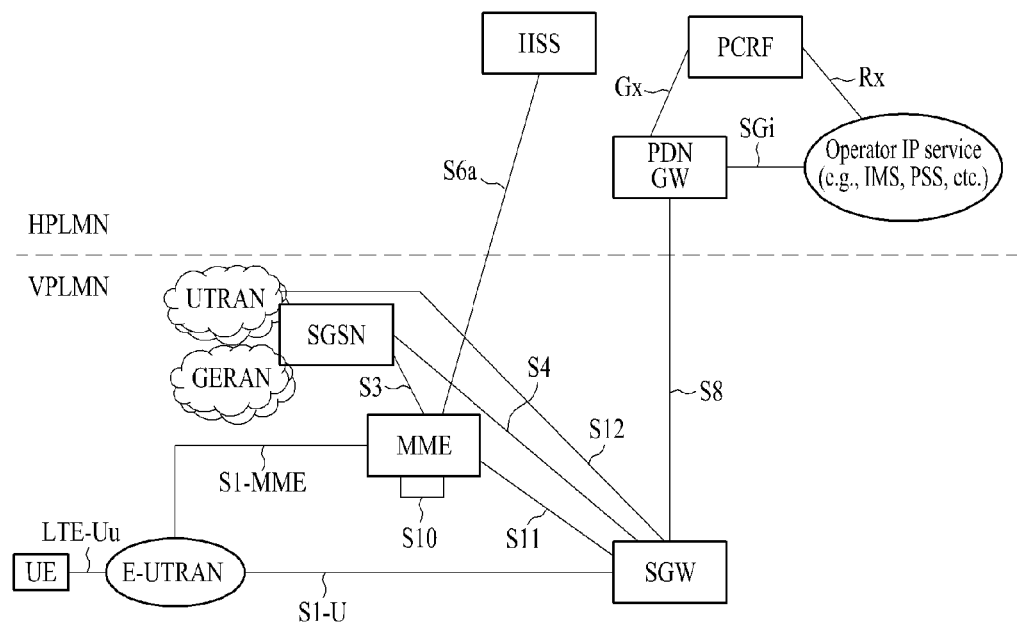

Reference points not shown in Table 1 from among reference points shown in FIG. 2 will hereinafter be described in detail. LTE-Uu is a radio protocol for E-UTRAN between the UE and the eNB. S10 is a reference point among MMEs for MME relocation and MME-to-MME information transfer, and may be used either in an intra-PLMN or in inter-PLMN. S6a is a reference point between MME and HSS, and is used to carry subscription and authentication data. S12 is a reference point between UTRAN and SGW. If a direct tunnel is established, S12 is used for user plane tunneling. Gx is used to transfer the policy and charging rules from PCRF to a Policy and Charging Enforcement Function (PCEF) contained in PDN GW. Rx is a reference point between AF (e.g., third party application server) and PCRF, and is used to transmit session information of an application level from AF to PCRF. Although FIG. 2 exemplarily shows an operator IP service, i.e., a Packet Switch Streaming (PSS) serving as a one-to-one multimedia streaming service using Session Initiation Protocol (SIP) for convenience of description, the scope or spirit of the present invention is not limited thereto, and various operator IP services can be applied thereto.

FIG. 2(a) shows a system structure for non-roaming Although FIG. 2(a) shows SGW and PDN GW implemented as different entities, it should be noted that the SGW and the PDN GW may be implemented as one gateway as necessary.

FIG. 2(b) shows a system structure for roaming The term "roaming" indicates that EPC communication is supported in a user-visited PLMN (i.e., VPLMN) instead of a Home PLMN (i.e., HPLMN) of a user. That is, as can be seen from FIG. 2(b), a UE of the user can access an EPC through VPLMN, and subscription and authentication information and the policy and charging rules are applied by HSS and PCRG present in HPLMN. In addition, the policy and charging rules may be applied by V-PCRF present in VPLMN. A visited-network operator may access a PDN supplied from the operator, and a roaming scenario using an IP service of the visited-network operator may also be used.

Figure 3:
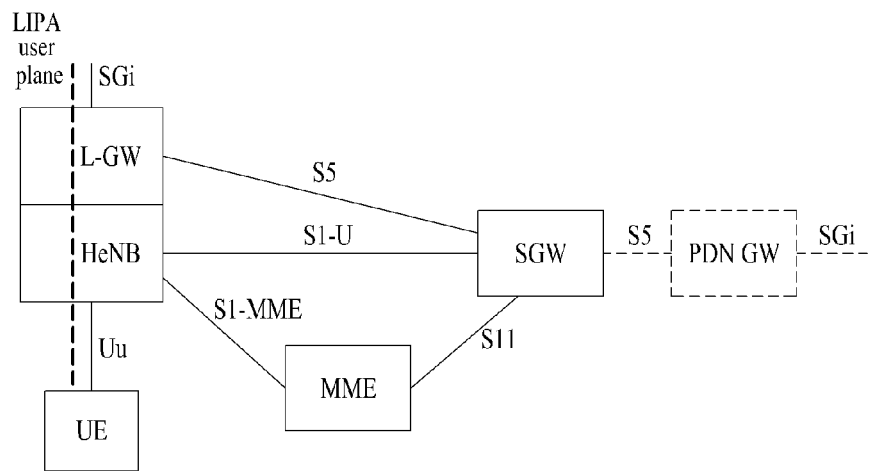
FIGS. 3(a) to 3(c) are conceptual diagrams illustrating exemplary LIPA structures.
Figure 3:
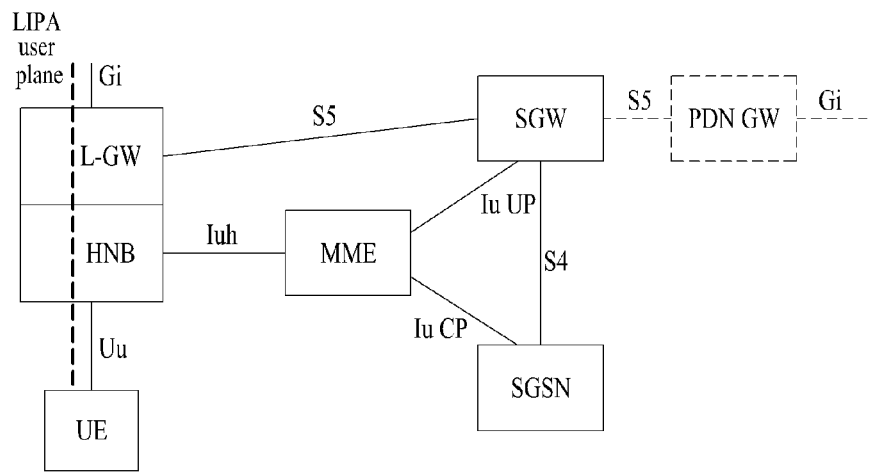
Figure 3:
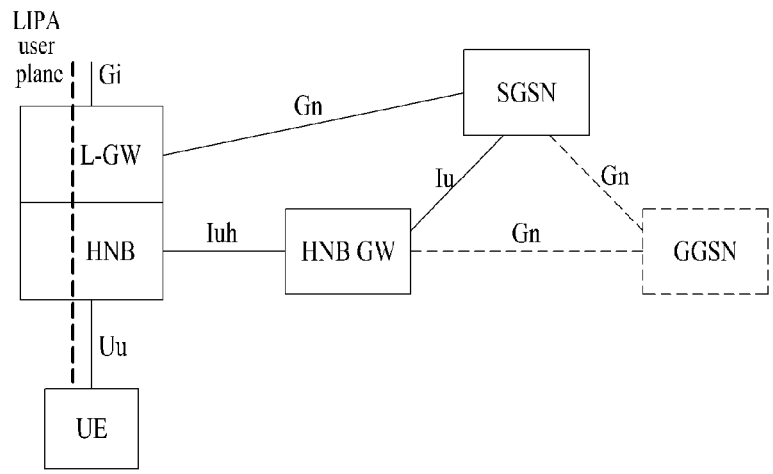

FIG. 3 illustrates exemplary LIPA structures.

FIGS. 3(a) to 3(c) illustrate exemplary H(e)NB subsystem structures for LIPA defined in 3GPP Release-10. In this case, the LIPA structure defined in 3GPP Release-10 is limited to a structure in which H(e)NB and a local gateway (LGW) are co-located. However, the above-mentioned description is disclosed for illustrative purposes only, and the principles of the present invention can also be applied to the case in which H(e)NB and LGW are located separately from each other.

FIG. 3(a) shows a LIPA structure for HeNB configured to use local PDN connection. Although not shown in FIG. 3(a), an HeNB subsystem includes a HeNB, and may selectively include HeNB and/or LGW. LIPA function may be carried out using LGW co-located with HeNB. The HeNB subsystem may be connected to MME and SGW of EPC through an S1 interface. If LIPA is activated, LGW has an S5 interface associated with SGW. LGW is a gateway for an IP network (e.g., residential/enterprise network) associated with HeNB, and may perform PDN GW functions, such as UE IP address allocation, Dynamic Host Configuration Protocol (DHCP) function, packet screening, etc. In addition, although a control plane of the LIPA structure is constructed through EPC, a user plane is constructed in a local network.

FIG. 3(b) and FIG. 3(c) show the HNB subsystem structure including HNB and HNB GW. The LIPA function may be carried out using LGW co-located with HNB. FIG. 3(b) shows an exemplary case in which HNB is connected to EPC, and FIG. 3(c) shows an exemplary case in which HNB is connected to SGSN. More detailed information of the LIPA structure shown in FIG. 3 may refer to standard documents TS 23.401 and TS 23.060.

PDN Connection

PDN connection represents a logical connection relationship between a UE (especially, an IP address of the UE) and a PDN. In order to receive a specific service from the 3GPP system, IP connectivity to the PDN configured to provide the corresponding service should be achieved.

3GPP provides multiple simultaneous PDN connection through which one UE can simultaneously access multiple PDNs. Initial PDN may be established according to a default APN. The default APN may correspond to a default PDN of the operator or enterprise. Designation of the default APN may be contained in subscriber information stored in HSS.

If the UE includes a specific APN in a PDN connection request message, the UE attempts to connect to PDN corresponding to the corresponding APN. After one PDN connection is generated, the corresponding specific APN must always be contained in an additional specific PDN connection request message from the UE.

Some examples of IP PDN connectivity available in EPS defined in 3GPP Release-10 are as follows. (One case of using non-3GPP access is excluded.)

A first example of IP PDN connectivity is 3GPP PDN connection via E-UTRAN. The first example is the most general PDN connection typically formed in 3GPP.

A second example of IP PDN connectivity is 3GPP PDN connection via H(e)NB. In case of 3GPP PDN connection via H(e)NB, PDN connection is formed by a procedure similar to PDN connection due to H(e)NB introduction, excluding an admission control part of a CSG membership.

A third example of IP PDN connectivity is LIPA PDN connection. LIPA PDN connection experiences not only admission control based on the CSG membership via H(e)NB, but also LIPA admission control caused by LIPA permission or non-permission.

An initial attach operation for 3GPP PDN connection for use in the above-mentioned three examples will hereinafter be described in detail.

Figure 4:
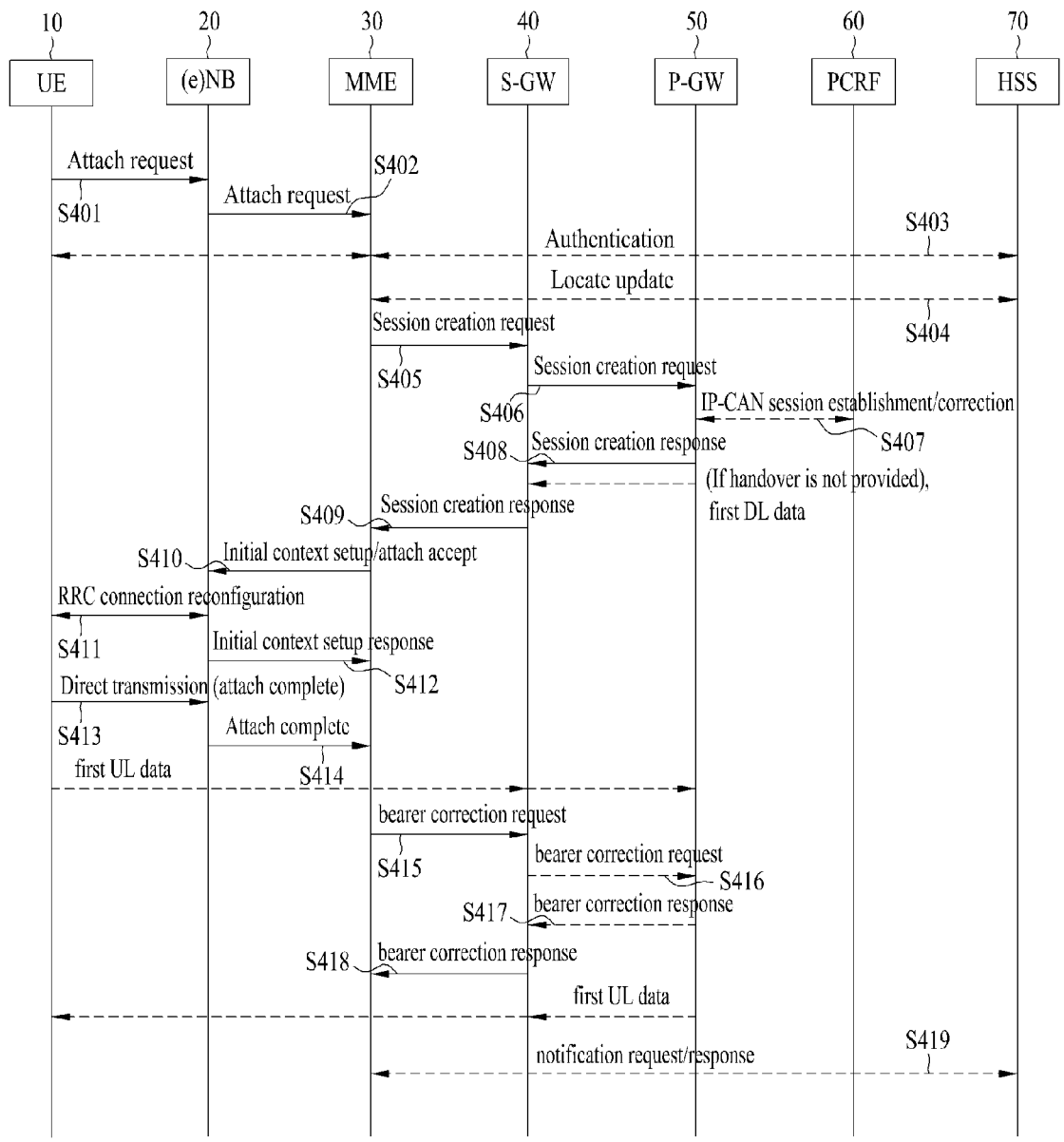
FIG. 4 is a flowchart illustrating an initial attach operation for implementing 3GPP PDN connection through E-UTRAN.

FIG. 4 is a flowchart illustrating an initial attach operation for implementing 3GPP PDN connection through E-UTRAN.

Referring to FIG. 4, a UE 10 may send an attach request message to MME 30 via eNB 20 in steps S401 and S402. In this case, the UE 10 may transmit an APN of a desired connection PDN along with the attach request.

In steps S403 and S404, MME 30 may perform an authentication procedure of the UE 10, and may register location information of the UE 10 in HSS 70. In this case, HSS 70 may transmit subscriber information of the UE 10 to the MME 30.

In steps S405 to S409 (where S407 is separately explained), MME 30 may send a create session request message to S-GW 40 so as to generate an EPS default bearer. S-GW 40 may send the create session request message to P-GW 50.

The create session request message may include a variety of information, for example, International Mobile Subscriber Identity (IMSI), Mobile Subscriber Integrated Services Digital Network Number (MSISDN), MME Tunnel Endpoint ID (TEID) of a control plane, Radio Access Technology (RAT) type, PDN GW address, PDN address, default EPS bearer QoS, PDN type, subscribed APN-AMBR (Aggregate Maximum Bit Rate), APN, EPS bearer ID, Protocol Configuration Options, Handover Indication, Mobile Equipment Identity (ME ID), ECGI, UE time zone, user CSG information, MS Info Change Reporting support indication, Selection Mode, Charging Characteristics, Trace Reference, Trace Type, Trigger ID, Operation Management Controller Identity (OMC ID), Maximum APN Restriction, Dual Address Bearer Flag, etc.

In response to the create session request message, P-GW 50 may send a create session response message to S-GW 40. S-GW 40 may send the create session response message to MME 30. Through the above procedures, Tunnel Endpoint ID (TEID) is exchanged between S-GW 40 and P-GW 50, and MME 30 may recognize TEIDs of S-GW 40 and P-GW 50. Step S407 is optional. The PCRF interaction for the operator policy may be performed between PCEF of P-GW 50 and PCRF 60 as necessary. For example, session of IP-CAN (Connectivity Access Network) serving as an access network for providing IP connectivity may be established and/or modified. IP-CAN is a term indicating various IP-based access networks. For example, IP-CAN may be GPRS or EDGE serving as an 3GPP access network, or may be a WLAN or a Digital subscriber line (DSL) network.

In step S410, the attach accept message may be transferred from MME 30 to eNB 20. TEID of S-GW 40 for UL data may also be transferred to the eNB 20. The attach accept message may request an initial context setup, such that radio resource setup of a RAN section (between UE 10 and eNB 20) can be initiated.

In step S411, Radio Resource Control (RRC) connection reconfiguration is performed. Accordingly, radio resources of the RAN section are set up so that the setup result of the radio resources can be transferred to the eNB 20.

In step S412, the eNB 20 may transmit a response message to the initial context setup to MME 30. Simultaneously, the radio bearer setup result may be transmitted.

In steps S413 and S414, an attach complete message from the UE 10 may be sent to MME 30 via the eNB 20. In this case, the eNB 20 may also transmit TEID of the eNB 20 for DL data. In addition, UL data may be transferred to S-GW 40 via the eNB 20, and UL data can be transferred from the UE 10.

In steps S415 to S418, a Modify Bearer Request message may be transferred from MME 30 to S-GW 40, and TEID of the eNB 20 for DL data may be transferred to S-GW 40 through the modify bearer request message. Steps S416 and S417 are optional, and a bearer between S-GW 40 and P-GW 50 may be updated as necessary. Thereafter, DL data may be transferred to UE 10 via eNB 20.

Step S419 is optional. In order to support mobility for a non-3GPP access network, if IDs of APN and PDN GW need to be stored in HSS 70, MME 30 may perform the HSS registration process through a Notify Request message, and may receive a Notify Response message from HSS 70.

Figure 5:
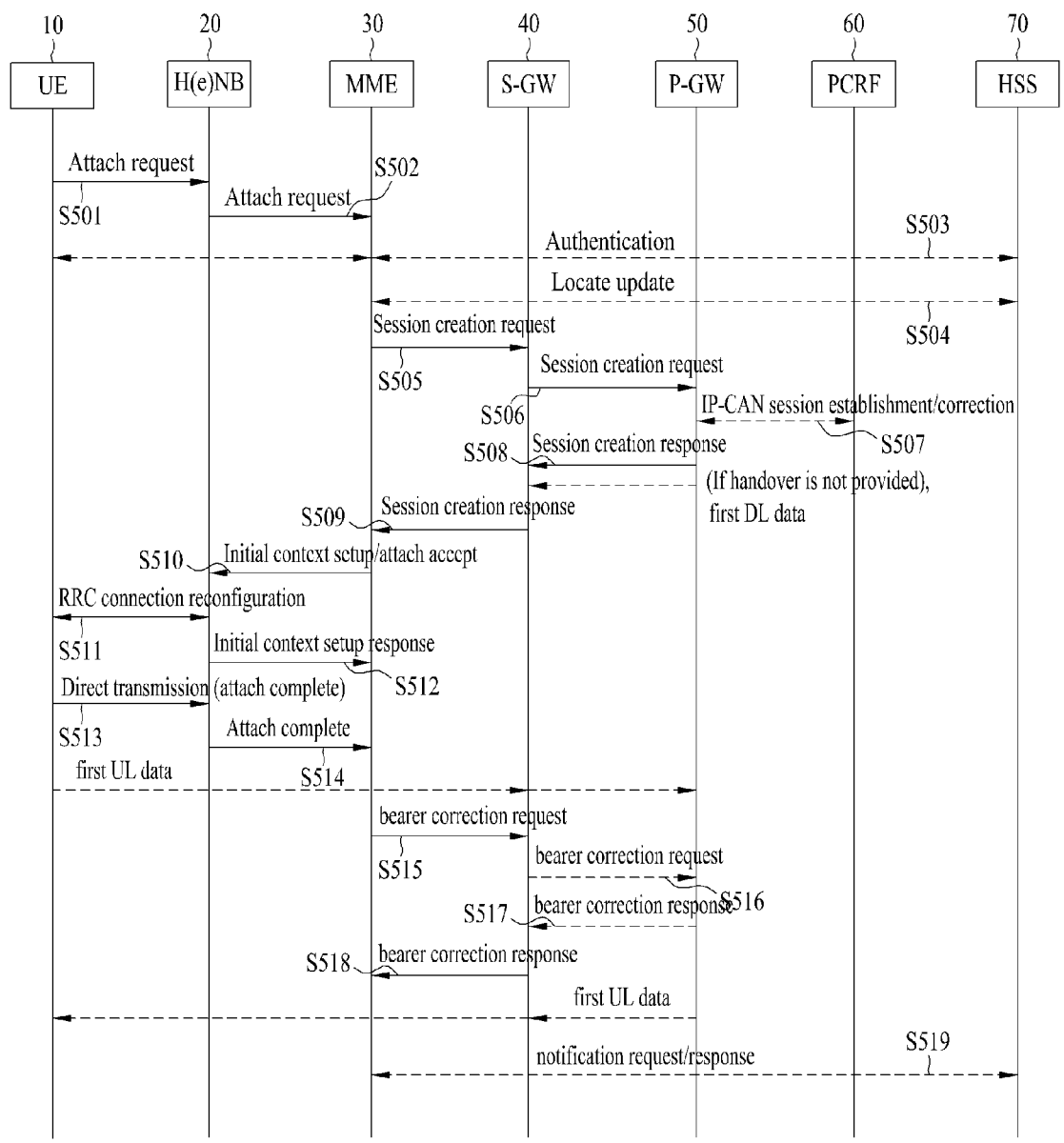
FIG. 5 is a flowchart illustrating an initial attach operation for implementing 3GPP PDN connection through H(e)NB.

FIG. 5 is a flowchart illustrating the initial attach operation for implementing 3GPP PDN connection through H(e)NB.

Referring to FIG. 5, the EPS initial attach procedure via H(e)NB is basically identical to the EPS initial attach procedure via eNB shown in FIG. 4. That is, if the eNB of FIG. 4 is replaced with H(e)NB of FIG. 5, the operations of S401~S419 of FIG. 4 can be equally applied to steps S501~S519 of FIG. 5. A detailed description of additional contents of the EPS initial attach procedure via H(e)NB will be given, and the same matters as those of FIG. 4 will herein be omitted for convenience of description.

In steps S501 and S502, if UE 10 connects to H(e)NB 20 through a CSG cell, the H(e)NB 20 may further include a CSG ID and an HeNB access mode in information received from the UE 10, and may send the attach request message to MME 30. If H(e)NB does not send the access mode information, a closed access mode may be configured In steps S503 and S504, subscriber information stored in HSS 70 may include CSG subscription information. CSG subscription information may include a CSG ID and expire time information. The CSG subscription information may be further transferred from HSS 70 to MME 10.

In steps S505 to S509, MME 30 may perform connection control on the basis of CSG subscription information and H(e)NB access mode, and the MME 30 may then transmit the create session request message to S-GW 40 so as to generate the EPS default bearer.

In step S510, if the UE 10 establishes connection via a hybrid cell, CSG membership state information of the UE 10 is contained in the attach accept message, H(e)NB can differentially control the UE 10 on the basis of the corresponding information. Here, hybrid access is a hybrid form of a Closed Access and Open Access. Whereas a hybrid cell basically serves all users as in the open access, the hybrid cell still has characteristics of the CSG cell. That is, a subscriber belonging to a CSG can receive a necessary service with higher priority than other users not belonging to the CSG, and additional charges may be assessed to the subscriber. The hybrid cell may be definitely distinguished from the closed cell not providing access to users not contained in the CSG.

Figure 6:
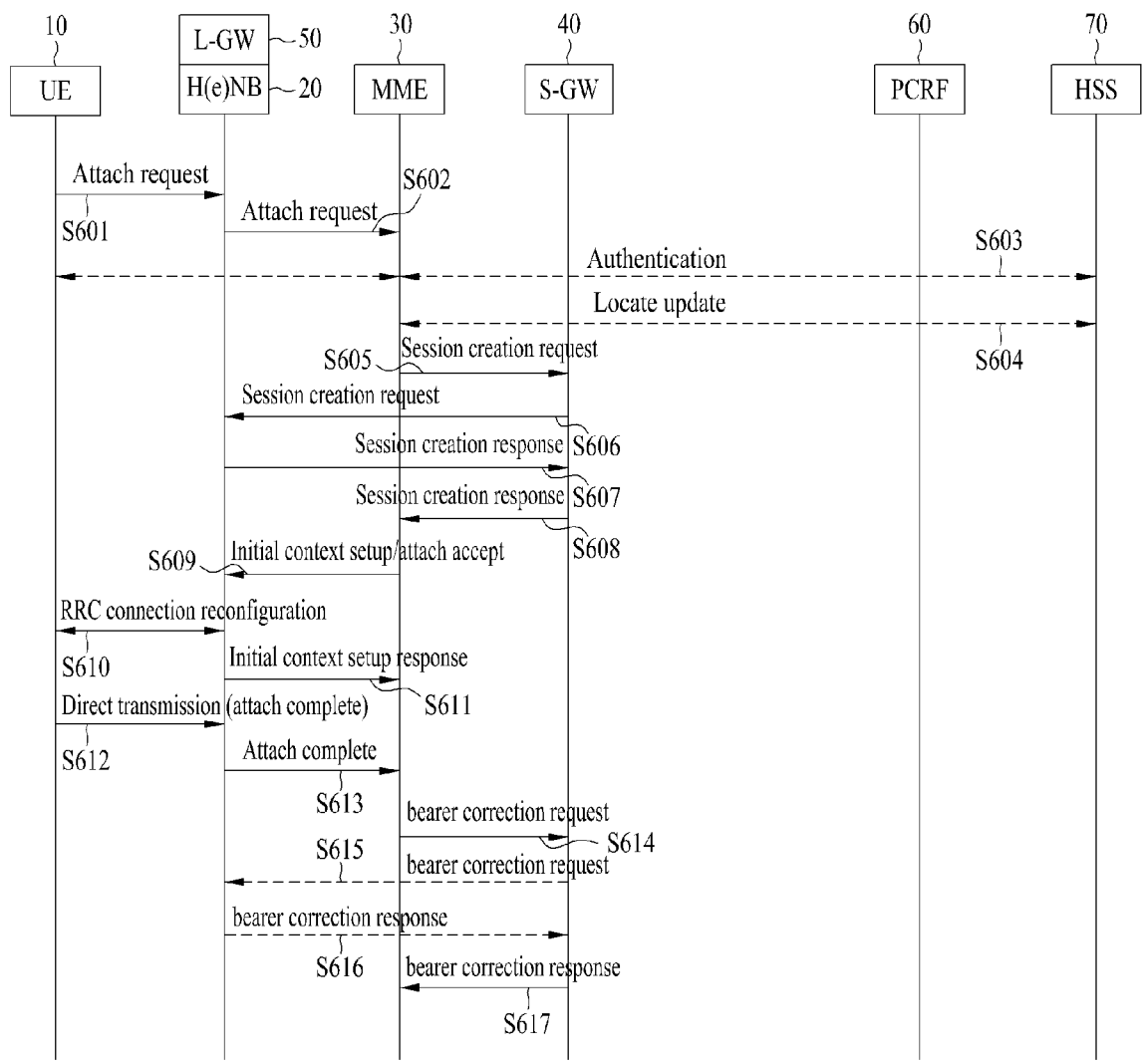
FIG. 6 is a flowchart illustrating an initial attach operation for LIPA PDN connection.

FIG. 6 is a flowchart illustrating the initial attach operation for LIPA PDN connection. Unlike the examples of FIGS. 4 and 5 showing the EPS initial attach procedure, FIG. 6 shows the LIPA initial attach procedure.

In steps S601 and S602, UE 10 may transmit an attach request message to MME 30 via H(e)NB 20. In this case, the UE 10 may transmit an APN of a desired connection PDN along with the attach request message. LIPA may transmit APN, i.e., LIPA APN of a home based network. H(e)NB 20 may further include CSG ID, HeNB access mode, and an address of the co-located L-GW 50 in information received from the UE 10, so that the H(e)NB 20 may transmit the attach request message to MME 30.

In steps S603 and S604, MME 30 may perform an authentication procedure of the UE 10, and may register location information of the UE 10 in HSS 70. In this case, HSS 70 may transmit subscriber information of the UE 10 to the MME 30. Subscriber information stored in HSS 70 may include CSG subscription information and LIPA associated information. The CSG subscription information may include CSG ID and expire time information. LIPA associated information may include not only indication information indicating whether LIPA is permitted in the corresponding PLMN, but also LIPA permission or non-permission information of the corresponding APN. Information regarding LIPA permission or non-permission may correspond to any one of LIPA-prohibited, LIPA-only, and LIPA-conditional. The CSG subscription information and LIPA associated information may be additionally transferred from HSS 70 to MME 10.

In steps S605 to S608, MME 30 may perform evaluation for controlling CSG and LIPA APN on the basis of CSG subscription information, H(e)NB access mode, LIPA associated information, etc. Such evaluation may include CSG membership confirmation, LIPA-permission confirmation, etc. According to the evaluation result, if the UE 10 can access LIPA APN via H(e)NB 20, MME 30 may send the create session request message t S-GW 40 so as to generate the EPS default bearer. S-GW 40 may send the create session request message to P-GW. If P-GW selection is performed, LIPA may use an address of the L-GW 50 from H(e)NB 20. In response to the create session request message, P-GW (or L-GW 50) may send the create session response message to S-GW 40, and the S-GW 40 may send the create session response message to MME 30. Through the above-mentioned procedures, TEID (Tunnel Endpoint ID) is exchanged between S-GW 40 and P-GW (or L-GW 50), and MME 30 may recognize TEIDs of S-GW 40 and P-GW (or L-GW 50). In addition, LIPA APN information may also be transferred to MME 30.

In case of LIPA APN of LIPA-conditional, if MME 30 receives information (e.g., address) of L-GW 50 from H(e)NB 20, the MME 30 may attempt to implement LIPA connection. If MME 30 does not receive information of L-GW 50 from H(e)NB 20, a PDN selection function for achieving PDN connection can be performed.

In step S609, the attach accept message may be transferred from MME 30 to eNB 20. This attach accept message can initiate the radio resource setup of the RAN section (between UE 10 and eNB 20) when the initial context setup is requested. In this case, information indicating that the above-mentioned PDN connection type is LIPA may be indicated, and correlation ID information for a user plane direct link path between H(e)NB 20 and L-GW 50 may also be transferred. The correlation ID may correspond to an ID of L-GW. If L-GW functions as PGW, TEID of P-GW may be assigned as L-GW ID without change.

In step S610, RRC connection reconfiguration is performed, and radio resources of the RAN section are set up, and the radio resource setup result may be transferred to H(e)NB 20.

In step S611, H(e)NB 20 may transmit a response message to the initial context setup to MME 30, and at the same time the H(e)NB 20 may transmit the radio bearer setup result.

In steps S612 and S613, the attach complete message from UE 10 may be transferred to MME 30 via H(e)NB 20. In this case, TEID of H(e)NB 20 for DL data may be transmitted.

In steps S614 to S617, the modify bearer request message may be transferred from MME 30 to S-GW 40, and TEID of H(e)NB 20 for DL data may be applied to S-GW 40 through the modify bearer request message. Steps S615 to S616 are optional, and the bearer between S-GW 40 and P-GW (or L-GW) 50 may be updated as necessary.

Figure 7:
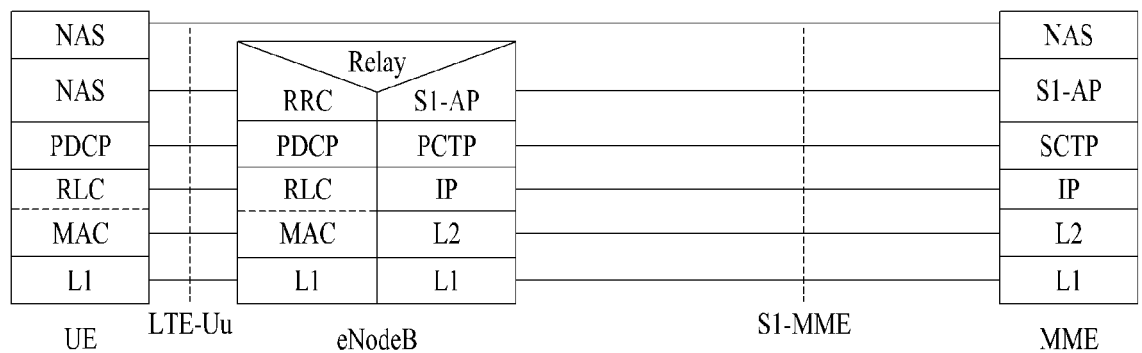
FIG. 7 is a conceptual diagram illustrating a control plane for an interface among UE, eNB, and MME.

FIG. 7 is a conceptual diagram illustrating a control plane for an interface among UE, eNB, and MME.

Referring to FIG. 7, MME may control connection to a UE to be connected to the MME, and an interface and protocol stack for such connection control are shown in FIG. 7. The interface shown in FIG. 7 corresponds to an interface among UE, eNB and MME shown in FIG. 2. In more detail, a control plane interface between UE and eNB is defined as LTE-Uu, and a control plane interface between eNB and MME is defined as S1-MME. For example, the attach request/response message between eNB and MME may be communicated using S1-AP protocol through S1-MME interface.

Figure 8:
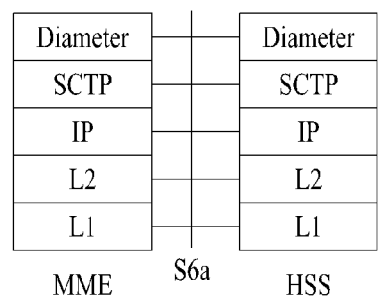
FIG. 8 is a conceptual diagram illustrating a control plane for an interface between MME and HSS.

FIG. 8 is a conceptual diagram illustrating a control plane for an interface between MME and HSS.

Referring to FIG. 8, a control plane interface between MME and HSS is defined as S6a. The interface shown in FIG. 8 may correspond to an interface between MME and HSS shown in FIG. 2. For example, MME may receive subscription information from HSS using a diameter protocol through the S6a interface.

Figure 9:
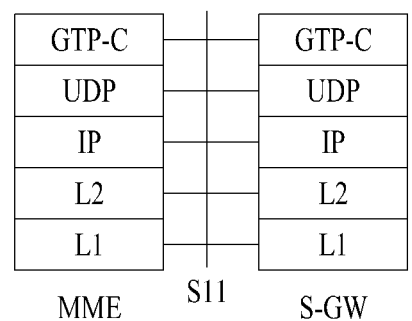
FIG. 9 is a conceptual diagram illustrating a control plane for an interface among MME, S-GW, and P-GW.
Figure 9:
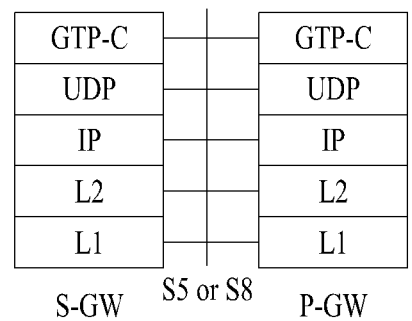

FIG. 9 is a conceptual diagram illustrating a control plane for an interface among MME, S-GW, and P-GW.

Referring to FIG. 9, the control plane interface between MME and S-GW is defined as S11 (See FIG. 9(a)), and the control plane interface between S-GW and P-GW is defined as S5 (in case of non-roaming) or S8 (in case of roaming) (See FIG. 9(b)). The interface shown in FIG. 9 may correspond to an interface among MME, S-GW, and P-GW shown in FIG. 2. For example, the request/response message for the EPC bearer setup (or GPRS Tunneling Protocol (GTP) tunnel creation) between MME and S-GW may be communicated using the GTP or GTPv2 protocol through the S11 interface. In addition, the request/response message for the bearer setup between S-GW and P-GW may be communicated using GTPv2 protocol through S5 or S8 interface. GTP-C protocol shown in FIG. 9 indicates a GTP protocol for a control plane.

Embodiment 1

Embodiment 1 shows a control method for MRA permission.

In accordance with the legacy network operation, if a UE requests MRA PDN connection, MME allows the UE to confirm LIPA-permission (LIPA-only, LIPA-conditional or LIPA-prohibited) and CSG subscription data of APN acting as a PDN connection request object of the UE. If the corresponding APN indicates LIPA-only, access from an external part via an EPC is prohibited. If the corresponding APN indicates LIPA-prohibited, access from an external part via EPC is permitted. If the requested UE is joined or registered in a CSG, MRA PDN connection for the corresponding LIPA-prohibited APN may be permitted. In the meantime, since LIPA-conditional APN is an APN for performing access via LIPA or EPC, remote access to the corresponding LIPA-conditional APN via EPC in an external network instead of a home based network (i.e., LIPA connection) may be permitted.

In addition, if the UE is roaming in a specific VPLMN, HPLMN, LIPA usage may be enabled or disabled. Accordingly, the UE may use LILPA in a visited network according to the roaming agreement between wireless operators (wireless enterprises). However, according to the current defined network operation, it is impossible to use an MRA service in a network (e.g., VPLMN) including a UE. That is, although it is impossible to confirm whether the UE uses LIPA (i.e., whether LIPA is allowed or not), it is impossible to manage permission or non-permission of the MRA service (i.e., whether MRA is allowed or not). If it is impossible to manage MRA permission or non-permission, one case in which the MRA service is supported for a specific UE cannot be distinguished from the other case in which the MRA service is not supported for the specific UE, and incorrect charging is achieved. Accordingly, a method for controlling/managing MRA permission or non-permission is requested.

This embodiment 1 relates to a method for enabling a UE of the 3GPP GSM/UMTS/EPS mobile communication system to remotely access a home based network (hereinafter also referred to as a local network). In accordance with the present invention, MME acting as a network node of the control plane may determine whether MRA PDN connection of the UE can be supported on the basis of MRA permission or non-permission. MRA permission or non-permission may be contained in subscriber information stored/managed in HSS, and may be provided to MME by HSS. In addition, if the UE requests MRA PDN connection, the MME can determine MRA permission or non-permission on the basis of subscriber information.

For example, MRA permission or non-permission may be configured on the basis of a UE-located network. Whereas MRA of a UE roaming in a certain VPLMN is permitted, MRA of another UE roaming in another VPLMN is not permitted.

In addition, MRA permission or non-permission may be configured on the basis of a subscriber. In accordance with the above-mentioned scheme, MRA is not permitted only in a specific VPLMN, and MRA permission or non-permission may be configured irrespective of VPLMN. That is, MRA permission or non-permission may be configured on the basis of a subscriber without receiving VPLMN information. For example, MRA permission from VPLMN to HPLMN is always permitted for a certain subscriber, and MRA permission from VPLMN to HPLMN is always permitted for another subscriber. In addition, MRA permission may be decided on the basis of the charging system (or a provision service level) of a subscriber.

In addition, MRA permission or non-permission may be configured on the basis of a target network (e.g., target PLMN). In this case, the target network indicates an objective network to which a UE located at a remote site will be connected. For example, the MRA target is not always HPLMN, and may be set to another PLMN. Accordingly, MRA to a specific PLMN may be permitted in the UE-visited network (e.g., VPLMN), and MRA to another PLMN may not be permitted. For this purpose, the roaming agreement with the VPLMN enterprise may be determined in advance.

In accordance with the present invention, MRA permission or non-permission may be configured according to various references as described above, and the operator or enterprise may more flexibly manage the MRA service, and may support a more accurate and detailed charging system. For example, since the operator or enterprise does not construct the system for MRA, MRA may not be permitted. Since the MRA service is not supported in the UE-visited VPLMN (or user-visited VPLMN), MRA may not be permitted. Alternatively, since the subscriber does not register in the charging system for MRA service, this means that MRA is not permitted.

For example, MRA permission or non-permission may be configured according to one of a UE-located network (e.g., VPLMN), a subscriber, and a target network, or a combination thereof.

In a detailed example of the present invention, VPLMN MRA Allowed information proposed by the present invention may be newly defined in VPLMN LIPA Allowed information contained in the legacy subscriber information. For example, subscription information managed by HSS may include the following items indicating MRA permission or non-permission shown in Table 1.

TABLE 2

| VPLM LIPA Allowed | Specifies per PLMN whether the UE is allowed to use LIPA. :LIPA-NOTALLOWED (0) LIPA-ALLOWED (1) |
|---|---|
| VPLMN MRA Allowed | Specifies per PLMN whether the UE is allowed to use MRA. :MRA-NOTALLOWED (0) MRA-ALLOWED (1) |

Alternatively, VPLMN MRA Allowed information newly defined according to the present invention may simultaneously indicate not only specific information indicating whether MRA via H(e)NB is permitted, but also other information indicating whether MRA via a macro eNB is permitted, as represented by the following Table 3.

TABLE 3

| VPLM LIPA Allowed | Specifies per PLMN whether the UE is allowed to use LIPA. :LIPA-NOTALLOWED (0) LIPA-ALLOWED (1) | | | |
|---|---|---|---|---|
| | Specifies per PLMN whether the UE is allowed to use MRA. | | | |
| VPLMN MRA | MRA via H(e)NB | | MRA via (e)NB | |
| Allowed | ALLOWED | NOTALLOWED | ALLOWED | NOTALLOWED |
| | 1 | 0 | 1 | 0 |
| | 1 | 0 | 0 | 1 |
| | 0 | 1 | 1 | 0 |
| | 0 | 1 | 0 | 1 |

In Table 3, MRA via H(e)NB indicates MRA PDN connection via an external H(e)NB instead of another H(e)NB connected to a home based network. In addition, MRA via (e)NB may indicate whether MRA PDN connection via another external macro (e)NB instead of the H(e)NB connected to the home based network is permitted. Embodiment 1 in which MRA permission information is used may be combined with Embodiment 2 indicating the MRA PDN connection type as necessary. More detailed information thereof will be described later with reference to Embodiment 2.

However, the aforementioned information indicating MRA permission or non-permission is not limited only to Table 2 or Table 3, and may be defined as specific information regarding one or more combinations indicating MRA permission or non-permission based on the above-mentioned various references (for example, references based on a UE-located network (e.g., VPLMN), a subscriber, and a target network).

In addition, the above-mentioned MRA permission or non-permission may be managed in the form of a list of permitted networks (i.e., a white list) or a list of non-permitted networks (i.e., a black list). In addition, the above-mentioned network list may be managed on the basis of a network group. For example, Networks 1, 2, and 3 may be managed as MRA-permitted networks. The MRA-permitted network may include at least HPLMN. In addition, permission of MRA of a network contained in Network Group A (including Networks 1, 2, and 3) may be managed. In addition, MRA permission or non-permission may include information indicating whether MRA is permitted from the viewpoint of the MRA target network, or other information indicating whether MRA is permitted from the viewpoint of a UE-located network requesting MRA.

In this case, MRA permission or non-permission may include specific information indicating whether MRA is permitted from the viewpoint of the MRA target network, or other information indicating whether MRA is permitted from the viewpoint of a UE-located network requesting MRA.

Here, MRA permission or non-permission should be understood as independent from LIPA permission or non-permission. As described above, MRA indicates that a user located outside of the home based network accesses the IP capable entity contained in the home network, and LIPA indicates that a UE accesses another entity contained in the same network via H(e)NB, such that MRA is clearly distinguished from LIPA. Accordingly, MRA permission or non-permission may be managed as an independent evaluation item unconcerned with LIPA permission or non-permission. However, any one item may also be configured as a precondition of another item. For example, MRA permission or non-permission may have LIPA dependency. That is, MRA permission or non-permission may be meaningful, only when LIPA is permitted.

In addition, one case in which the operation for enabling the UE to use LIPA in a certain VPLMN is permitted and the other case in which MRA for HPLMN is permitted may be managed as independent evaluation items. Alternatively, any one item may be configured as a precondition of another item. For example, permission or non-permission of MRA for HPLMN may be confirmed only when LIPA is permitted in the corresponding VPLMN. That is, if LIPA is not permitted in the corresponding VPLMN, MRA permission or non-permission may not be confirmed.

Figure 10:
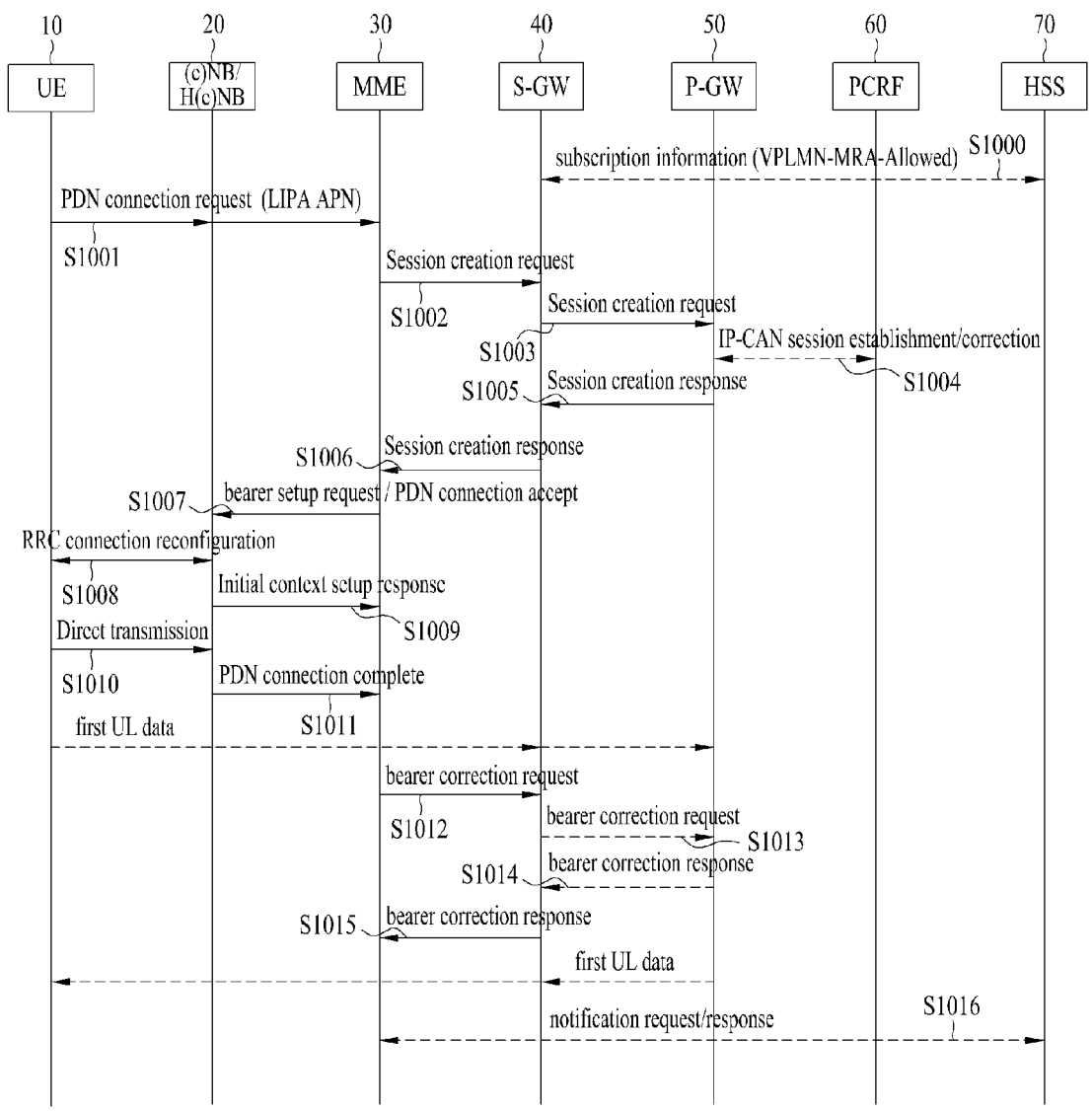
FIG. 10 is a flowchart illustrating an MRA PDN connection process using specific information indicating whether MRA is permitted according to an embodiment.

FIG. 10 is a flowchart illustrating an MRA PDN connection process using specific information indicating whether MRA is permitted according to an embodiment.

Referring to FIG. 10, for clarity of description, an exemplary case in which the PDN connection control/management operation considering MRA permission or non-permission is applied to a UE-requested PDN connectivity will hereinafter be described in detail. However, the scope or spirit of the present invention is not limited thereto, it should be noted that the MRA control method can be applied to a general procedure such as Tracking Area Update (TAU) or an initial attach request.

In step S1000, it is assumed that MME 30 obtains subscriber information of a UE 10 through an initial attach process (not shown). Subscriber information stored in HSS 70 may include PLMN associated information, LIPA-permission information associated with each APN, CSG subscription information, etc. In accordance with the present invention, the above-mentioned subscriber information may further include information regarding MRA permission or non-permission (e.g., VPLMN-MRA-ALLOWED). Although FIG. 10 exemplarily shows VPLMN-MRA-ALLOWED as one example indicating MRA permission or non-permission, the scope or spirit of the present invention is not limited thereto, and information regarding MRA permission or non-permission of various references/formats may also be applied to the present invention.

In step S1001, the UE 10 may transmit a PDN connectivity request message to MME 30 via (e)NB/H(e)NB 20. In this case, the PDN connection request message includes APN information of a PDN to which the UE 10 desires to connect, and the corresponding APN information of the present invention may correspond to LIPA APN of the home based network (or local network). However, the scope or spirit of the present invention is not limited thereto, and the present invention can also be applied to another case in which MRA APN is requested independently from LIPA.

In steps S1002 to S1006 (differently from S1004), MME 30 may evaluate whether VPLMN MRA for the UE 10 is permitted or not. In this example, it is assumed that the UE 10 is located in VPLMN (i.e., the UE 10 is roaming.). MME 30 may be evaluated on the basis of VPLMN MRA ALLOWED information from among subscriber information obtained at step S1000. In addition, MME 30 may perform evaluation for CSG and LIPA APN control (e.g., CSG membership confirmation, LIPA-permission confirmation, etc.). If the evaluation result indicates that MRA service is permitted, MME 30 may transmit the create session request message to S-GW 40 so as to generate the EPS default bearer. S-GW 40 may transmit the create session request message to P-GW 50. In response to the create session request message, P-GW 50 may transmit the create session response message to S-GW 40, and the S-GW 40 may transmit the create session response message to MME 30. Through the above-mentioned process, TEID is exchanged between S-GW 40 and P-GW 50, and MME 30 may recognize TEIDs of S-GW 40 and P-GW 50.

Step S1004 is optional. If necessary, the PCRF interaction for the operator policy may be carried out between PCEF of P-GW 40 and PCRF 60. For example, IC-CAN session acting as an access network providing IP connectivity may be established and/or modified.

In step S1007, the PDN connection permission message from MME 30 may be applied from MME 30 to (e)NB/H(e)NB 20. In addition, TEID of S-GE 40 for UL data may also be applied to (e)NB/H(e)NB 20. This message requests bearer setup, such that radio resources setup of the RAN section (between UE 10 and eNB 20) may be initiated.

In step S2008, RRC connection reconfiguration is performed, and radio resources of the RAN section are set up, and the radio resource setup result may be transferred to (e)NB/H(e)NB 20.

In step S1009, the radio bearer setup result may be applied from (e)NB/H(e)NB 20 to MME 30.

In steps S1010 to S1011, a PDN connectivity complete message from the UE 10 may be transferred to MME 30 via (e)NB/H(e)NB 20. In this case, (e)NB/H(e)NB 20 may further transfer TEID of (e)NB/H(e)NB 20 for DL data.

In steps S1012 to S1015, the modify bearer request message may be transferred from MME 30 to S-GW 40, and TEID of (e)NB/H(e)NB 20 for DL data may also be transferred to S-GW 40. Steps S1013 to S1014 are optional, and the bearer between S-GW 40 and P-GW 50 may be updated as necessary.

Step S1016 is optional. If it is necessary for IDs of APN and PDN GW to be stored in HSS 70 so as to support mobility for the non-3GPP access network, MME 30 may perform HSS registration through the notify request message, and may receive the notify response message from HSS 70.

Although the example of FIG. 10 has disclosed that information regarding MRA permission or non-permission is contained/used in the legacy message and procedure, the scope or spirit of the present invention is not limited thereto. That is, the scope of the present invention includes examples in which MRA permission or non-permission information is contained/used in the new message and procedure not defined in the conventional art.

In accordance with the scheme for indicating MRA permission or non-permission of the above-mentioned examples, the operator or enterprise may manage MRA permission or non-permission per network and/or per subscriber when the operator provides the MRA-associated service to a user, and different MRA permission or non-permission processes may be assigned according to the charging system levels of subscribers.

Embodiment 2

Embodiment 2 relates to a method for identifying new PDN connection type. In accordance with the legacy network operation, MME may discriminate between LIPA PDN connection and general PDN connection, but a method for discriminating between a PDN connection type via H(e)NB of the local network and other PDN connection has not yet been proposed. For example, a method for discriminating between MRA PDN connection through which an external part attempts to access a specific home based network and other PDN connection has not yet been proposed.

As discussed above, in accordance with the legacy network operation, it is impossible for the legacy network operation to inform the UE of the presence or absence of MRA PDN connection. In addition, it is impossible to discriminate MRA PDN connection, such that it is impossible to definitely determine whether a data session to the home based network will be maintained during a UE handover. In addition, it is impossible for the operator or enterprise to assess distinctive charges to the MRA service, such that a method for discriminating and controlling/managing MRA PDN connection is requested.

This embodiment relates to a method for enabling a UE for use in the 3GPP GSM/UMTS/EPS mobile communication system to remotely access the home based network (also referred to as a local network). For example, the present invention may provide a method for enabling MME acting as a network node of the control plane to distinguish MRA PDN connection from other PDN connection as well as to inform a UE and/or other network node (e.g., P-GW) of the discriminated result. In addition, to guarantee a remote access of the home based network and the service continuity, the present invention may provide a method for discriminating a data session type depending on an access network to be connected to the UE during handover, and informing the UE and/or other network node (e.g., P-GW) of the discriminated result.

In more detail, the present invention basically provides a method for defining MRA PDN connection indication information. The MRA PDN connection indication information defined by the present invention may indicate whether the corresponding PDN connection is MRA PDN connection. In more detail, the MRA PDN connection information may also indicate the MRA PDN connection type.

Figure 11:
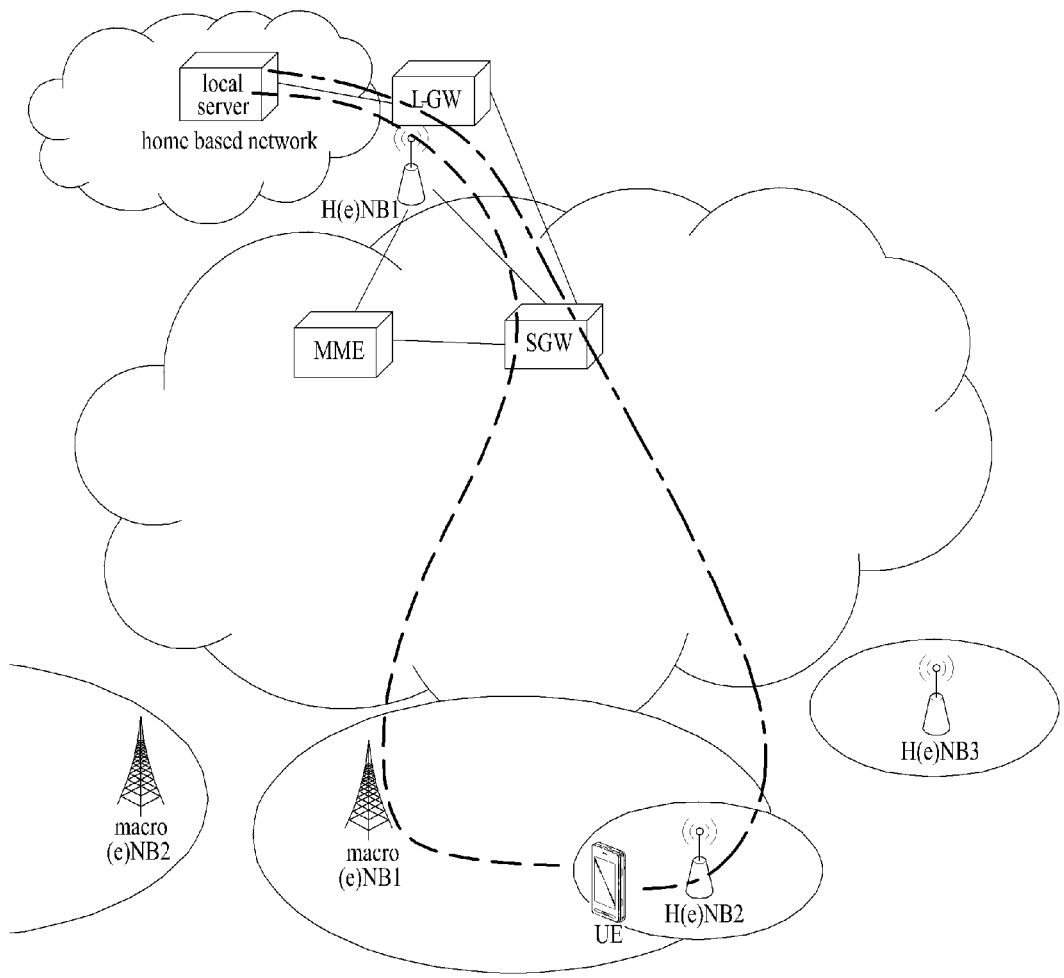
FIG. 11 is a conceptual diagram illustrating examples of MRA PDN connection.

FIG. 11 is a conceptual diagram illustrating examples of MRA PDN connection. Referring to FIG. 11, although FIG. 11 exemplarily shows the relationship among H(e)NB, L-GW, SGW, and MME connected to the home based network, the scope or spirit of the present invention is not limited thereto, the examples of the present invention may also be equally applied to HNB, L-GW, HNB GW, SGW, and SGSN shown in FIGS. 3(*b*) to 3(*c*). Although FIG. 11 shows a direct path between SGW and L-GW, the direct path may pass through additional logical/physical network nodes.

Referring to FIG. 11, a CSG user located at an external part of the home based network may access the IP capable entity (e.g., local server) connected to the home based network. In this case, MRA PDN connection via a macro (e)NB (i.e., eNB1 shown in FIG. 11) may be formed (including the case of roaming and the other case of non-roaming), and MRA PDN connection via H(e)NB (i.e., H(e)NB2 shown in FIG. 11) not contained in the home based network may be formed (including the case of roaming and the other case of non-roaming) The present invention may define not only a method for discriminating between MRA PDN connection and other PDN connection, but also indication information for defining a more detailed MRA PDN connection type. For example, the present invention may discriminate between MRA PDN connection type via macro (e)NB and other MRA PDN connection type via H(e)NB, and indicate the discriminated result. For convenience of description, information indicating the presence or absence of MRA PDN connection and/or other information indicating the MRA PDN connection type will hereinafter be referred to as "MRA PDN connection indication information".

In addition, MRA PDN connection indication information may be used in UE and/or P-GW.

MRA PDN connection indication information is notified to the UE, so that control based on MRA PDN connection may be carried out. For example, among a plurality of services supplied to the UE, one or more permitted-or non-permitted services may be discriminated and controlled. Alternatively, MRA PDN connection indication information may be used to inform a UE's user of a MRA PDN connection state (i.e., a state in which an external part is accessing the home based network). In this case, specific information indicating whether MRA PDN connection indication information will be notified to the UE may be based on the operator policy. The associated operator policy may be dynamically established or pre-configured. MRA PDN connection indication information is notified to P-GW, the operator or enterprise may apply distinctive charging distinguished from different types of PDN connection, such that a detailed and flexible charging system can be provided.

In addition, MRA PDN connection indication information may further include information for discriminating a handover type. In more detail, various handover scenarios may be assumed according to types of the access network to which the UE is connected for MRA PDN connection. For example, the access network may be mainly classified into three types, i.e., A, B and C. For example, Type A is H(e)NB connected to the home based network, Type B is (e)NB not connected to the home based network, and Type C is H(e)NB not connected to the home based network. In addition, the following handover scenarios may be assumed in consideration of handover directivity.

1) Handover from Type A to Type B: In FIG. 11, this means the case in which a UE having formed a data session of LIPA PDN connection at H(e)NB is handed over a macro (e)NB1 located outside of the home based network 2) Handover from Type A to Type C: In FIG. 11, this means the case in which a UE having formed a data session of LIPA PDN connection at H(e)NB1 is handed over to H(e)NB2 located outside of the home based network 3) Handover from Type B to Type A: In FIG. 11, this means the case in which a UE having formed a data session of MRA PDN connection at a macro (e)NB1 located outside of the home based network is handed over to H(e)NB1 of the home based network.

4) Handover from Type B to Type B: In FIG. 11, this means the case in which a UE having formed a data session of MRA PDN connection at a macro (e)NB1 located outside of the home based network is handed over to an external macro (e)NB2 of the home based network.

5) Handover from Type B to Type C: In FIG. 11, this means the case in which a UE having formed a data session of MRA PDN connection at a macro (e)NB1 located outside of the home based network is handed over to H(e)NB2 located outside of the home based network.

6) Handover from Type C to Type A: In FIG. 11, this means the case in which a UE having formed a data session of MRA PDN connection at H(e)NB2 located outside of the home based network is handed over to H(e)NB 1 of the home based network.

7) Handover from Type C to Type B: In FIG. 11, this means the case in which a UE having formed a data session of MRA PDN connection at H(e)NB2 located outside of the home based network is handed over to a macro (e)NB1 located outside of the home based network.

8) Handover from Type C to Type C: In FIG. 11, this means the case in which a UE having formed a data session of MRA PDN connection at H(e)NB2 located outside of the home based network is handed over to H(e)NB3 located outside of the home based network.

The above-mentioned handover scenario-based distinction may also be referred to a handover type or a type of a data session to be handed over. For clarity of description, although the above-mentioned handover scheme will hereinafter be generically named "handover type", it should be noted that distinction between types may be applied to respective data sessions.

In addition, handover types may be respectively distinguished from one another, may be grouped/discriminated, or only some handover types may be selectively discriminated. Accordingly, by means of "MRA PDN connection indication information" including handover type information, it may be determined whether service continuity will be provided in association with MRA PDN connection according to handover types (or type groups), and distinctive charges per handover type (or type group) may be applied.

In addition, determining whether a data session per handover type will be maintained before, during or after handover. In addition, it may also be determined whether a data session will be maintained according to an interaction with a user or UE. In addition, the interaction with a user/UE may be dynamically carried out, or may be carried out on the basis of information pre-configured in the UE. In addition, information indicating whether a data session per handover type will be maintained according to subscriber information may be determined In addition, information as to whether a session will be maintained on the basis of a handover type or information as to whether different charges will be applied on the basis of a handover type may be determined according to the HPMN subscriber and/or the local subscriber policy.

The scope or spirit of the present invention is not limited to examples of the above-mentioned handover type, and the examples in which the principles proposed by the present invention are applied to various handover scenarios and different classifications of individual network types may be contained in the scope of the present invention.

For example, MRA PDN connection indication information may include one or more combinations of specific information indicating whether MRA PDN connection is achieved, information indicating the MRA PDN connection type, and handover type indication information.

In the detailed example of the present invention, MME may use the create session request message so as to inform P-GW of MRA PDN connection indication information. The create session request message may correspond to a tunnel management message from among GTP-C messages that are transferred from MME to P-GW via S-GW during the initial attach process or a UE-requested PDN connection process. MRA PDN connection indication information defined by the present invention may be contained in the create session request message.

For example, charging associated information may be contained in the create session request message. The charging associated information may be a unique ID allocated for per-bearer billing, and may be an identifier for identifying the corresponding bearer from among various records (i.e., charging data record CDR) generated by a Packet switched Core network Node (PCN). In accordance with the present invention, the create session request message includes new charging associated information corresponding to MRA PDN connection, so that the corresponding PDN connection having a requested session creation message may indicate MRA PDN connection.

The following Table 3 shows some IEs from among IEs contained in the create session request message.

TABLE 3

| IE | Contents |
|---|---|
| ... | |
| Sender F-TEID for Control Plane | MME/S-GW TEID |
| PGW S5/S8 Address for Control Plane or PMIP | PGW TEID |
| Access Point Name (APN) | APN = LIPA-APN |
| ... | |
| Bearer Contexts to be created | EPS bearer ID |
| | S1-U eNB F-TEID |
| | S5/S8 U SGW F-TEID |
| | S5/S8 U PGW F-TEID |
| ... | |
| User CSG Information (UCI) | CSG ID |
| | access mode |
| | CSG membership indication |
| Charging Characteristics | charging behaviour defined on a per operator basis |
| ... | |

In Table 3, "Sender F-TEID for Control Plane" may have a Fully qualified-TEID (F-TEID) of MME or S-GW acting as a transmitter of the create session request message. "PGW S5/S8 Address for Control Plane or PMIP" may have a specific value corresponding to address information of the last receiver PGW of the create session request message. "Bearer Contexts to be created" may include a value (ID, or F-TEID value) for specifying the bearer, and may include an IE corresponding to the number of bearers. "User CSG Information (UCI)" may include a value indicating CSG information of a user. "Charging Characteristics" acting as some parts of subscriber information may be supplied to MME by HLR/HSS, and may indicate specific charging rules defined per operator. For example, the "Charging Characteristics" value may be defined by the size of 16 bits, and each bit may indicate a specific behaviour scheme. Charging associated information corresponding to MRA PDN connection indication information may be contained in the above-mentioned "Charging Characteristics" information.

In addition, a new IE other than the example IE of Table 3 is added, such that the added result may be defined as MRA PDN connection indication information, the legacy defined IE may be reused, or MRA PDN connection indication information may be defined using reserved bit values.

In a detailed example of the present invention, in order to inform a UE of MRA PDN connection indication information by MME, MME may use the attach accept message. The attach accept message may be transmitted through a NAS PDU (Protocol Data Unit) IE of the initial context setup request message defined by S1-AP protocol. The following Table 4 indicates some IEs from among IEs contained in the initial context setup request message.

TABLE 4

| IE | Contents |
| --- | --- |
| Message Type | Initial Context Setup Request |
| | ... |
| UE Aggregate Maximum Bit Rate | UE AMR Downlink, UE AMR Uplink |
| E-RAB to Be Setup List | |
| > E-RAB to Be Setup Item IEs | |
| >>E-RAB ID | xx (integer value) |
| ... | ... |
| >>Transport Layer Address | yy ... (Bit String) |
| >>GTP-TEID | zz ... (Octet string) |
| >>NAS-PDU (TS 24.301) | Message Type = Attach Accept |
| | ... |
| | EPS attach result |
| | ... |
| | EMS Message Container  //Table 5// |
| | ... |

In Table 4, "Message Type" may have a specific value for uniquely identifying the transmitted message, and may have a value of the Initial Context Setup Request message. "UE Aggregate Maximum Bit Rate" is applied to all non-Guaranteed bit rate bearers, is a total UL/DL maximum bit rate, and is applied to eNB by MME. "E-RAB to Be Setup List" may correspond to the list of E-UTRAN Radio Access Bearer (E-RAB) to be set up. "E-RAB ID" is given as an integer value for uniquely identifying RAB of a specific UE. "Transport Layer Address" may correspond to an IP address, and may be given as a bit string. "GTP-TEID" may correspond to GTP-TEID used for transmission of a user plane between eNB and SGW, and may be given as an octet string. "NAS-PDU" may include a message between EPC and UE, where the message is transmitted without interpretation of the eNB.

In the example of Table 4, a message type contained in "NAS-PDU IE" may indicate an attach accept message. "EPS attach result" is an IE for specifying the result of attach processing, and may be coded with bit values indicating the result of EPS-only, combined EPS/IMSI attach, etc. "ESM message container" is an IE through which piggyback transmission of single EPS Session Management (ESM) is possible within the EPS Mobility Management (EMM) message. "ESM message container" according to the present invention will hereinafter be described with reference to the following Table 5.

The following Table 5 shows some IEs from among IEs contained in "EMS Message Container" contained in NAS PDU shown in Table 4.

TABLE 5

| IE | Contents |
| --- | --- |
| Message Type | Activate default EPS bearer context request |
| | ... |
| PDN address | IP address |
| | ... |
| Connectivity type | 0011 |
| | ... |

In Table 5, "PDN address" may allocate an IPv4 address to a PDN-associated UE, and may be used to provide an interface ID to be used for creation of the IPv6 link local address. As can be seen from Table 5, "Connectivity type" may include information for specifying a connection type to be selected for PDN connection. As a detailed example of the present invention, new bit values indicating the MRA PDN connection type proposed by the present invention may be additionally defined in the legacy "Connectivity type" information.

TABLE 6

| Connectivity type value (octet 1) Bits |
| --- |
| 4 3 2 1 |
| 0 0 0 0  The PDN connection type is not indicated |
| 0 0 0 1  The PDN connection is considered a LIPA PDN connection |
| 0 0 1 1  The PDN connection is considered a MRA PDN connection via Macro cell |
| 0 0 1 0  The PDN connection is considered a MRA PDN connection via H(e)NB |
| All other values shall be interpreted as "the PDN connection type is not indicated". |

In Table 6, a bit value '0000' indicating that "Connectivity type" does not indicate the PDN connection type, and a bit value '0001' indicating LIPA PDN connection may be as the legacy bit values. In a detailed example of the present invention, a bit value '0011' indicating MRA PDN connection via a macro cell, and a bit value '0010' indicating MRA PDN connection via H(e)NB may be newly defined in "Connectivity type". MRA PDN connection indication information proposed by the present invention is not limited to Tables 3 to 6, and may be defined as one or more combinations of attributes of MRA PDN connection based on various references (MRA PDN connection or non-connection, MRA PDN connection, or handover type).

Figure 12:
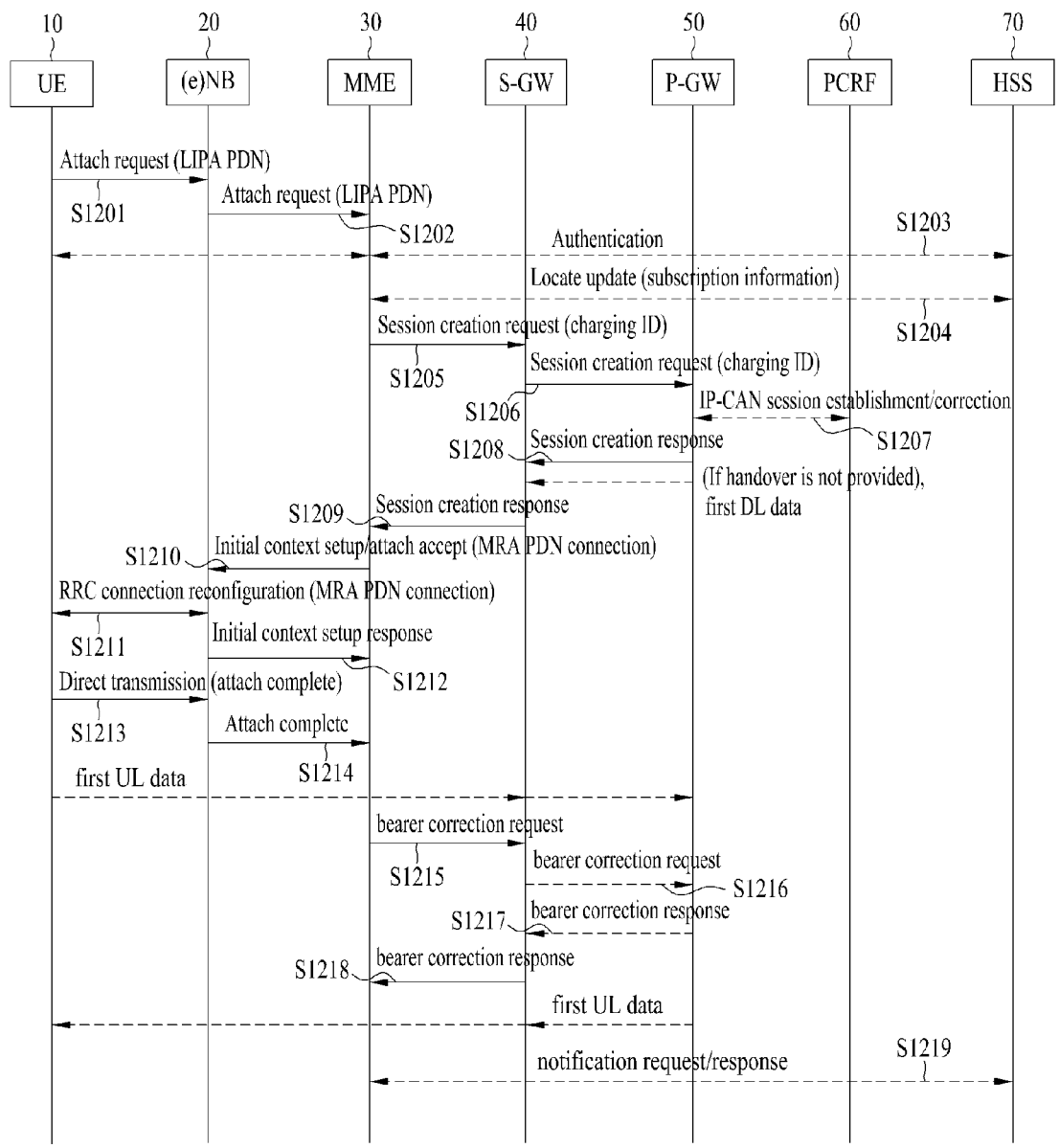
FIG. 12 is a flowchart illustrating an MRA PDN connection process using MRA PDN connection indication information according to an embodiment.

FIG. 12 is a flowchart illustrating an MRA PDN connection process using MRA PDN connection indication information according to an embodiment.

For clarity of description, FIG. 12 exemplarily shows the MRA PDN connection establishment process through the initial attach request procedure in case of MRA PDN connection via a macro cell. However, the scope or spirit of the present invention is not limited thereto, and a method for MRA control in a general procedure such as TAU (Tracking Area update) or UE requested PDN connectivity may also be applied to the present invention without difficulty. In addition, the principles of the present invention can also be equally applied to MRA PDN connection via H(e)NB located outside of the home based network.

In steps S1201 and S1202, the UE 10 may transmit the attach request message to MME 30 via (e)NB 20. In this case, the UE may send MRA APN acting as an APN of a desired connection PDN, independently from LIPA APN or LIPA of the home based network.

In steps S1203 to S1204, MME 30 may perform authentication of the UE 10 and register location information of the UE 10 in HSS 70. In this case, HSS 70 may transmit subscriber information of the UE 10 to the MME 30.

In this case, the subscriber information may further include LIPA-permission information and CSG subscription information of the corresponding APN among subscriber information stored in HSS 70. In this case, if LIPA-permission information of the home based network corresponding to LIPA APN is set to LIPA-condition, access to the home based network via a macro cell may be permitted.

In addition, subscriber information may include MRA-permission information described in Embodiment 1. MRA permission or non-permission information may include MRA permission or non-permission information depending on MRA PDN connection type (e.g., via a macro cell or H(e)NB) (See Table 3). Accordingly, when MME 30 generates MRA PDN connection indication information, MME 30 may also determine MRA permission or non-permission. However, independently from MRA permission or non-permission of Embodiment 1, MRA PDN connection indication information of Embodiment 2 may be used.

In steps S1205 to S1209 (S1207 will be described separately later), MME 30 may perform control evaluation of CSG and LIPA APN (e.g., CSG membership confirmation, LIPA-permission confirmation, or MRA-permission confirmation, etc.). If the evaluation result indicates that MRA service for the UE 10 is permitted, MME 30 may transmit the create session request message to S-GW 40 so as to generate the EPS default bearer. S-GW 40 may send the create session request message to P-GW 50.

In accordance with the present invention, MRA PDN connection indication information may be contained in the create session request message. Accordingly, P-GW 50 may recognize MRA PDN connection attributes (for example, MRA PDN connection or non-connection, MRA PDN connection type, or handover type). For example, either distinctive charging associated information for MRA PDN connection or indication information indicating the MRA PDN connection type may be contained in the create session request message. The example of FIG. 12 may indicate that the corresponding PDN connection is MRA PDN connection via a macro cell.

In response to the create session request message of step S1206, P-GW 50 may send the create session response message to S-GW 40, and S-GW 40 may transmit the create session response to MME 30. Through the above-mentioned process, TEID (Tunnel Endpoint ID) is exchanged between S-GW 40 and P-GW 50, and MME 30 may recognize TEIDs of S-GW 40 and P-GW 50.

In addition, LIPA APN information may be transferred through the create session request/response. If a request for accessing LIPA APN (i.e., home based network) via a macro cell occurs, or if a request for accessing LIPA APN (i.e., home based network) via H(e)NB not contained in the home based network occurs, MME performs gateway selection, such that the MME can select an appropriate P-GW for providing the MRA service to the UE through the gateway selection function. A more detailed description of the above-mentioned gateway selection will be described with reference to Embodiment 3.

Step S1207 is optional, and the PCRF interaction for the operator policy may be carried out between PCEF of P-GW 50 and PCRF 60 as necessary. For example, establishment and/or correction of the IP-CAN session acting as an access network configured to provide IP connectivity may be carried out.

In step S1210, the attach accept message may be transferred from MME 30 to (e)NB 20. TEID of S-GW 40 for UL data may also be transferred to the eNB 20. The attach accept message may request an initial context setup, such that radio resource setup of a RAN section (between UE 10 and eNB 20) can be initiated. In step S1211, Radio Resource Control (RRC) connection reconfiguration is performed. Accordingly, radio resources of the RAN section are set up so that the setup result of the radio resources can be transferred to the eNB 20.

In steps S1210 and S1211, MRA PDN connection indication information may be contained in the attach accept message. Accordingly, UE 10 may recognize MRA PDN connection attributes (MRA PDN connection or non-connection, MRA PDN connection, or handover type). For example, the attach accept message may be transferred through NAS PDU IE contained in the initial context setup request message, and MRA PDN connection indication information may also be contained using a connectivity type of the attach accept message. The example of FIG. 12 may indicate that the corresponding PDN connection is MRA PDN connection via a macro cell. In this case, specific information indicating whether MRA PDN connection indication information will be notified to UE 10 may be dynamically configured or may be based on the pre-configured operator.

In addition, MRA connection indication information is configured as an indicator indicating distinctive charges for MRA PDN connection, and may be notified to the UE 10. In addition, MRA connection indication information may be configured in the form of an indicator capable of requesting/deriving interactions of user/UE.

In addition, not only MRA connection indication information but also a user/UE question about MRA PDN connection may be applied to UE 10. For example, selection indicating whether a data session will be maintained is requested for a user/UE, and the operation of a selection result may be carried out. User/UE selection may be dynamically carried out, and may be determined on the basis of pre-configured information. In addition, if the user/UE intention is pre-configured by subscriber information, the operation for querying the user/UE intention may be omitted according to the operator policy or the user configuration.

In step S1212, (e)NB 20 may transmit a response message to the initial context setup to MME 30. The result of radio bearer setup may be transmitted.

In steps S1213 and S1214, the attach complete message may be transferred from UE 10 to MME 30 via (e)NB 20. In this case, (e)NB 20 may also transmit TEID of (e)NB 20 for DL data.

In steps S1215 to S1218, the modify bearer request message may be transferred from MME 30 to S-GW 40, and TEID of (e)NB 20 for DL data may be applied to S-GW 40 through the modify bearer request message. Steps S1216 and S1217 are optional, and the bearer between S-GW 40 and P-GW 50 may be updated as necessary.

Step S1219 is optional. In order to support mobility for a non-3GPP access network, if IDs of APN and PDN GW need to be stored in HSS 70, MME 30 may perform the HSS registration process through a Notify Request message, and may receive a Notify Response message from HSS 70.

The procedures shown in FIG. 12 may be stopped/interrupted on the basis of interactions with the UE, the subscriber information, the operator policy, etc. Alternatively, the detach or resources release process may be carried out after successful attach or resource allocation.

In addition, although MRA PDN connection indication information is contained/used in the legacy message and procedures as shown in FIG. 12, the scope or spirit of the present invention is not limited thereto. That is, examples including MRA PDN connection indication information for use in the new message and procedures not defined in the legacy art are contained in the scope of the present invention.

Figure 13:
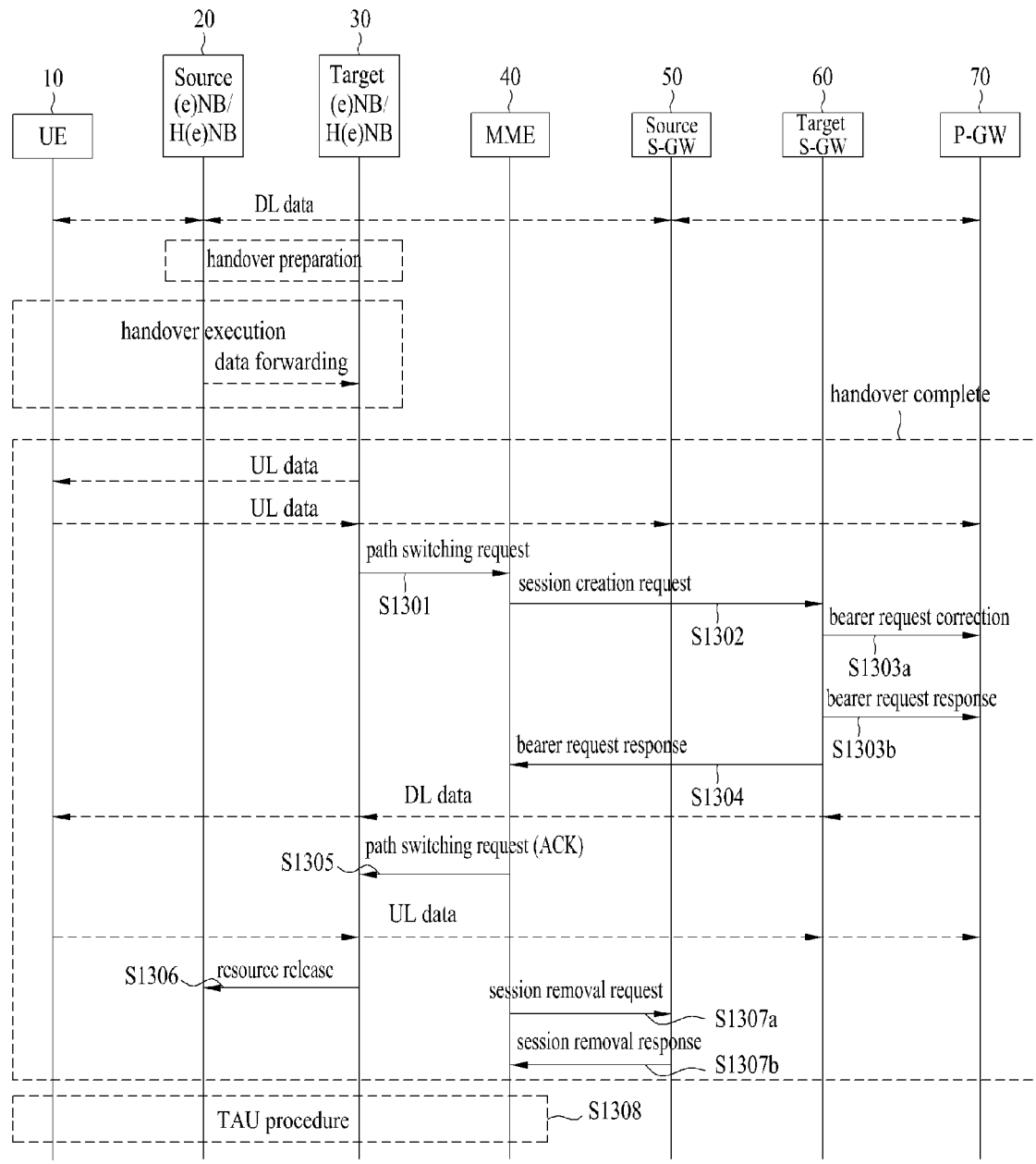
FIG. 13 is a flowchart illustrating a handover process using MRA PDN connection indication information according to an embodiment.

FIG. 13 is a flowchart illustrating a handover process using MRA PDN connection indication information according to an embodiment.

The handover procedure of the present invention is not limited to the example of FIG. 13, and various examples in which MRA PDN connection indication information is used in an arbitrary handover procedure are contained in the scope or spirit of the present invention.

As described above, MRA PDN connection indication information may be defined as one or more combinations indicating MRA PDN connection or non-connection, MRA PDN connection type, or MRA PDN connection attribute of the handover type. During the handover process, MRA PDN connection indication information may be used to determine whether a data session of MRA PDN connection will be maintained after completion of handover to a target (e)NB/H(e)NB.

For example, specific information indicating whether a data session is maintained may be decided by interactions with the user/UE. The interaction with the UE/UE may be dynamically carried out, or may be determined according to the preconfigured information (i.e., values predetermined by the operator or user).

In addition, the user/UE interaction based on MRA PDN connection indication information may be carried out at various time points. For example, the user/UE interaction may be carried out i) before the beginning of handover (e.g., before handover execution of FIG. 13, ii) during a handover procedure (e.g., in which RRC connection associated message is exchanged), iii) during a TAU (Tracking Area Update) process corresponding to the last handover process, or iv) after completion of all handover processes.

In addition, upon receiving a negative indication (i.e., information indicating that a data session to be changed (or changed) by handover is not maintained any longer) during the user/UE interaction, the handover procedure may be stopped/interrupted,or the bearer deactivation process and/or resource release process may be carried out after handover completion.

The handover procedure may be stopped/interrupt in case of MRA PDN connection according to the operator policy or subscriber information, or the bearer deactivation and/or resource release process may be carried out after handover completion. For example, assuming that only handover from the home based network from among various handover scenarios is configured by the operator, the handover scenarios 2), 5), 7), and 8) may not maintain the data session of MRA PDN connection. In addition, specific information indicating whether a data session is maintained during handover is not determined on the basis of the operator policy or subscriber information, and the user/UE further selects whether to maintain the data session, such that the associated operation may be achieved.

In the example of FIG. 13, if MME 40 receives the path switch request in step S1301, modification of the access network of a data session can be recognized. For example, MME 40 may determine whether the access network is changed on the basis of reception information from (e)NB/H(e)NB, subscriber information received from HSS, and the operator policy, etc.

In steps S1302 to S1304, MME 40 may transmit the create session request message including MRA PDN connection indication information to a target S-GW 60. In this case, MRA PDN connection indication information may be represented by charging associated information, connection type information, etc. In addition, MRA PDN connection indication information may be transmitted through a separate message instead of the create session request message. In addition, S-GW 60 may apply MRA PDN connection indication information to P-GW 70. P-GW 70 having received MRA PDN connection indication information may use the corresponding information to the charging system application and the like. Interactions between P-GW 70 and PCRF (not shown) are needed for such charging. Specifically, in case of MRA PDN connection via H(e)NB, L-GW acting as P-GW should be interoperable with PCRF. In this case, assuming that a direct interface between L-GW and PCRF is not present, L-GW may communicate with PCRF via other network nodes such as MME/S-GW. Alternatively, a new interface between L-GW and PCRF is defined and direct communication may be possible between L-GW and PCRF.

General items of handover may be applied to steps S1305 to S1307.

In addition, MME 40 may inform the UE 10 of a handover data session type and/or charging information (i.e., information corresponding to MRA PDN connection indication information). For this purpose, a TAU accept message or a new message is defined in the TAU procedure subsequent to the handover procedure, and is then applied to the UE 10. The above-mentioned procedures may operate in a similar way to the attach accept message of steps S1210 and S1211. That is, MRA PDN connection indication information may be notified to the UE 10, or information as to whether a data session of the UE 10 will be maintained is independently selected, and a response to this information is received, so that the associated operation may be carried out. In this case, selection of UE 10 may be dynamically carried out, and this UE selection may be decided on the basis of preconfigured information. In addition, if intention of the UE 10 is confirmed in advance by subscriber information, the operation for querying UE intention may be omitted according to the operator policy or the user configuration.

Although FIG. 13 has exemplarily disclosed that MRA PDN connection indication information is contained/used in the legacy message and procedure, the scope or spirit of the present invention is not limited thereto. That is, examples in which MRA PDN connection indication information proposed by the present invention is contained/used in the new message and procedure not defined in the legacy art are contained in the scope of the present invention.

In accordance with the above-mentioned scheme for employing MRA PDN connection indication information, the operator may provide the MRA associated service to the user according to a flexible charging system. If charging for MRA PDN connection having specific attributes can be discriminated, the operator or enterprise can provide a method for solving PDN connection via EPC and another PDN connection via specific H(e)NB (or local network) using the charging system. The user may provide a method for performing flexible selection in association with a method of maintaining a data session to the home based network before/during/after handover.

In accordance with the method for using MRA PDN connection indication information according to the examples, a UE having received MRA PDN connection indication information may perform interactions for selecting specific information as to whether connection considering a connection type is permitted. Alternatively, an extended control method based on the connection type may be provided.

Instead of using distinction between LIPA PDN connection and general PDN connection, MME can distinguish MRA PDN connection from other PDN connection, the present invention can provide various PDN connection control methods using the corresponding information by informing UE and/or P-GW (or a network node taking charging of such charging) of associated information.

In addition, a data session is discriminated according to various attributes on the basis of MRA PDN connection indication information, such that charges for the corresponding data session, quality (QoS), and service class, etc. can be managed according to more detailed classes.

Embodiment 3

Embodiment 3 relates to a method for selecting a gateway node for MRA services.

The following three scenarios for enabling a UE to access an IP capable entity (or device) connected to a home based network may be used, as such a detailed description thereof will be described.

1) Scenario 1: UE may access the IP capable entity connected to the same home based network through H(e)NB connected to the home based network, for example, the UE served by H(e)NB1 of the home based network of FIG. 11 may access the local server.

2) Scenario 2: UE may access the IP capable entity connected to the home based network at a remote site of the home based network. The scenario 2 can be classified into the following two scenarios.

2-1) Scenario 2-1: UE may access the IP capable entity connected to the home based network via a macro cell located outside of the home based network (including the roaming case or the non-roaming case). For example, the UE may access the local server of the home based network via (e)NB1 of FIG. 11 (MRA access via the macro cell).

2-2) Scenario 2-2: UE may access the IP capable entity connected to the home based network via another H(e)NB located outside of the home based network (including the roaming case or the non-roaming case). For example, the UE may access the local server of the home based network served by H(e)NB2 of FIG. 11 (MRA access via H(e)NB).

In order to allow the UE to access the IP capable entity connected to the home based network, PDN connection appropriate for the above-mentioned scenarios must be generated. PDN connection may indicate a logical connection relationship between UE (i.e., IP address of UE) and PDN. The PDN creation request may be achieved through the attach request and the UE-requested PDN connectivity, etc. Here, a gateway (P-GW or Gateway GPRS support node (GGSN)) appropriate for the corresponding PDN needs to be selected.

MME operations for enabling MME to perform P-GW selection so as to generate PDN connection will hereinafter be described with reference to the above-mentioned three UE access scenarios regarding home based networks. The operations of UE 10, (e)NB/H(e)NB 20, and MME 30 in steps S1001 and S1002 of FIG. 10 will hereinafter be described in the following description. In addition, the H(e)NB subsystem acting as the home based network will hereinafter be described with reference to FIG. 3. In addition, it is assumed that LIPA-permission of APN configured to request PDN connection by UE is identical to LIPA-conditional.

In Scenario 1, if the UE transmits a PDN connection creation request including APN configured to access the IP capable entity connected to the home based network to H(e)NB, when H(e)NB served by the UE transmits the above PDN connection creation request message to MME, an L-GW address co-located with H(e)NB may also be included in the PDN connection creation request message. In addition, H(e)NB may include an ID of CSG providing a necessary service in the PDN connection creation request message, and transmit the resultant PDN connection request message to MME. MME having received the PDN connection creation request message may evaluate/authenticate whether a connection-requested APN is permitted for the CSG. If authentication is successful, MME may select the corresponding L-GW as P-GW using the L-GW address received from H(e)NB. That is, through S-GW, the create session generation request may be transferred to the selected P-GW. Accordingly, PDN connection is generated through the selected P-GW, and this PDN connection is referred to as LIPA PDN connection.

In case of the above scenario 2-1, if the UE transmits the PDN connection creation request including APN configured to access the IP capable entity connected to the home based network to a macro (e)NB, MME may perform gateway selection. The gateway selection function means that MME selects the appropriate S-GW/P-GW in relation to HSS (i.e., considering real-time load, network topology, weight factor, etc.) such that a specific S-GW/P-GW to be used for routing data transmitted from the UE can be selected. Accordingly, the UE may select P-GW configured to implement connection to the home based network desired to be connected to the UE and may create PDN connection through the selected P-GW, and this PDN connection is referred to as MRA PDN connection via a macro cell (or (e)NB). However, a detailed method for correctly selecting P-GW (e.g., L-GW co-located with H(e)NB1 as shown in FIG. 11) desired to be accessed by UE has not yet been disclosed.

In case of the above scenario 2-2, if the UE transmits a PDN connection creation request including APN configured to access the IP capable entity connected to the home based network to H(e)NB (e.g., H(e)NB2 located outside of the home based network, instead of H(e)NB1 connected to the home based network), when H(e)NB2 served by the UE transmits the above PDN connection creation request message to MME, an L-GW address co-located with H(e)NB2 may also be included in the PDN connection creation request message. In addition, H(e)NB may include an ID of CSG providing a necessary service in the PDN connection creation request message, and transmit the resultant PDN connection request message to MME. MME having received the PDN connection creation request message may evaluate/authenticate whether a connection-requested APN is permitted for the CSG. In this case, CSG in which H(e)NB1 connected to the home based network provides a service may correspond to CSG ID#1, and CSG in which H(e)NB2 of an external network in which UE is currently located may correspond to CSG ID#2. During the MME authentication process, APN of the home based network desired to be connected by UE may not be permitted for CSG of CSG ID#2. In this case, MME authentication fails. That is, if the UE requests the MRA access service via another H(e)NB located outside of the home based network, the PDN connection creation request may be rejected due to authentication failure according to the current MME operation.

Alternatively, in case of Scenario 2-2, the case in which CSG authentication of MME is not performed is assumed. For example, if it is assumed that permission or non-permission information as to whether a UE-requested APN (i.e., home based network connected to H(e)NB1) is permitted for CSG of CSG ID#2 served by H(e)NB2 is not may evaluated/authenticated. In this case, MME may select L-GW co-located with H(e)NB (i.e., H(e)NB2) connected to UE as P-GW. Accordingly, LIPA PDN connection at a UE-connected network (i.e., the network connected to H(e) NB2) is generated. That is, PDN connection is created, and other PDN connection to the home based network desired to be connected by UE is not achieved, such that the UE cannot receive a desired MRA service.

Accordingly, in order to provide PDN connection to a UE requesting the MRA service, the case of MRA PDN connection requesting is recognized by the network and a gateway node selection scheme is requested.

The present invention relates to a method for allowing a control node (e.g., MME or SGSN) to select an appropriate gateway node (e.g., P-GW or GGSN/P-GW) in the 3GPP GSM/UMTS/EPS mobile communication system in such a manner that the UE can remotely access the home based network (also called a local network). For example, if the UE generates a PDN connection creation request (See Scenario 2-1 and/or Scenario 2-2) so as to access the IP capable entity (i.e., MRA access) connected to the home based network at a remote site of the home based network, the present invention may provide a method for selecting P-GW (e.g., L-GW co-located with H(e)NB1) in such a manner that connection to the home based network desired to be connected by UE is possible.

The PDN selection scheme according to the present invention may include the following procedures.

A control node (e.g., MME) may examine LIPA-permission regarding APN (hereinafter referred to as APN#1) desired by the UE for PDN connection creation. MME may obtain LIPA-permission information for each APN from the subscriber information stored in HLR/HSS. In addition, MRA permission or non-permission information is contained in subscriber information, and MME may further examine MRA permission or non-permission (See Embodiment 1). For example, MRA permission or non-permission information may be defined in association with LIPA-permission information, or may be defined independently. In addition, LIPA-permission information may explicitly or implicitly include information regarding MRA permission or non-permission.

In addition, APN#1 where UE requests PDN connection creation may be LIPA APN for creating LIPA PDN connection, or may be MRA APN for MRA PDN connection. However, MRA APN is not defined/managed separately, and MRA services may be applied to LIPA APN. That is, if LIPA APN to which UE connection is requested is identical to an APN of a UE-located network, LIPA PDN connection is carried out. If LIPA APN to which UE connection is requested is not identical to another network instead of the UE-located network, MRA PDN connection may be carried out.

In this case, if MRA APN is managed separately from LIPA APN, APN contained in the PDN connection creation request message may be configured on the basis of UE interaction information and/or UE camp-on H(e)NB/(e)NB information.

In addition, if APN#1 where PDN connection creation is requested by UE is identical to LIPA-conditional APN, and/or of the MRA service is possible, MME may determine the presence or absence of a CSG ID received from H(e) NB/(e)NB configured to serve the UE camp-on cell. The CSG ID may be included in an S1AP message (e.g., INITIAL UE MESSAGE) transferred from eNB to MME, such that the resultant S1AP message may be applied to MME.

The camp-on scenario of the UE can be classified into the following cases i), ii), and iii). i) UE is connected to H(e)NB (i.e., H(e)NB1 of FIG. 11) connected to the home based network, and H(e)NB1 may provide MME with CSG ID (hereinafter referred to as CSG ID#1) served by the MME. ii) UE is camped on a macro cell and is connected to (e)NB ((e)NB1 shown in FIG. 11) serving this cell. iii) UE is connected to an other external H(e)NB (i.e., H(e)NB2 shown in FIG. 11) of the home based network, and H(e)NB#2 provides MME with a CSG ID (hereinafter referred to as CSG ID#2) served by H(e)NB#2.

In the case in which MRA APN is operated separately from LIPA APN, this case is classified into a first case in which APN for which UE connection is requested is identical to MRA APN and a second case in which the APN is identical to LIPA APN are classified If APN requested by UE is identical to MRA APN, MME may select H(e)NB1 co-located L-GW as P-GW so as to access the IP capable entity connected to the home based network according to the above method for obtaining P-GW information needed when MME obtains MRA PDN connection creation. In the above-mentioned case ii) or iii), the above operations may be carried out, such that MRA PDN connection for UE may be created.

The above method for enabling MME to obtain P-GW information needed for MRA PDN connection creation will hereinafter be described in detail. This method may be appreciated as a method for obtaining P-GW information used to access the IP capable entity connected to the home based network by the UE located outside of the home based network, and one or more combinations of the following methods may be used.

Subscriber information obtained from HSS by MME may explicitly include address information of L-GW (i.e., H(e)NB1 co-located with H(e)NB1 shown in FIG. 11) of P-GW for LIPA and/or MRA services.

Subscriber information obtained from HSS by MME may include specific information capable of deriving or searching for an address of L-GW acting as P-GW for LIPA and/or MRA services. For example, ID information of a local H(e)NB network including H(e)NB1 and L-GW, and information capable of obtaining L-GW address using a DNS (Domain Name System) may be used.

Information obtained from HSS or third node by MME may include P-GW address information for implementing connection to each home based network. For example, ID information capable of identifying each subscriber and a mapping table of the P-GW address may be used.

MME may obtain address information of the corresponding P-GW from the UE requesting MRA PDN connection. For example, MME may directly obtain the corresponding P-GW information through UE-associated interactions (through other nodes), or may directly or indirectly obtain the corresponding P-GW information through a message (e.g., initial attach request, PDN connection request, or a message transmitted for other procedures instead of PDN connection request) previously sent from the UE.

In association with the method for allowing MME to obtain P-GW information needed for MRA PDN connection creation, the scope or spirit of the present invention is not limited to the above-mentioned examples, and P-GW information for MRA PDN connection may be applied to MME using other methods.

If MRA APN is operated separately from LIPA APN, a UE-requested APN is LIPA APN, MME may select L-GW received from H(e)NB as P-GW. In case of the above-mentioned case (i), such operations may be carried out, such that LIPA PDN connection may be created for UE.

If MRA APN is not operated separately from LIPA APN, associated operations are classified according to specific information indicating the presence or absence of CSG ID information.

If MME has CSG ID (i.e., if UE is connected to H(e)NB as shown in the above case i) or iii)), the following operations can be carried out.

MME may decide CSG ID for a UE-requested APN is permitted (or included) on the basis of CSG subscription information contained in subscriber information. The following Table 7 shows Attribute Value Pair (AVP) formats for CSG subscription information. CSG-ID IE (Information Element) shown in Table 7 may be defined as a fixed-length value indicating CSG ID. Expiration-Date IE includes information of an expiration time at which subscription to the corresponding CSG-ID expires. Service-Selection IE includes APN information permitted for the corresponding CSG-ID.

TABLE 7

CSG-Subscription-Data ::= <AVP header: 1436 10415>
{ CSG-Id }
[ Expiration-Date ]
*[ Service-Selection ] : For a CSG ID that can be used to access specific PDNs via Local IP Access, the CSG ID entry includes the corresponding APN(s).
*[AVP]

In addition, MME may receive CSG ID information through which the corresponding H(e)NB provides the service from H(e)NB connected to UE. Accordingly, MME may compare CSG ID (i.e., CSG ID obtained from the above subscriber information) through which APN requested by UE is permitted (or included) with CSG ID received from H(e)NB connected to UE.

If CSG ID used for permission (or inclusion) of a UE-requested APN is identical to CSG ID received from H(e)NB connected to UE, MME may select H(e)NB co-located L-GW as P-GW. The corresponding L-GW address may be provided by H(e)NB. In case of the above case (i), such operations can be carried out, such that LIPA PDN connection for UE may be created.

If CSG ID used for permission (or inclusion) of a UE-requested APN is different from CSG ID received from H(e)NB connected to UE, MME may select P-GW configured to provide appropriate PDN connection for the UE-requested APN, instead of selecting L-GW received from H(e)NB connected to UE. That is, MME may select L-GW (e.g., H(e)NB1 co-located L-GW as shown in FIG. 11) for accessing the IPC capable entity connected to the home based network as P-GW, according to the method for enabling MME to obtain P-GW information needed for MRA PDN connection creation. In case of the above case (iii), the above operations can be carried out, such that non-LIPA (or MRA) PDN connection for UE may be created.

If MRA APN is not operated independently from LIPA APN, and if MME has CSG ID information (i.e., if the UE is connected to a macro (e)NB as shown in the case (ii)), the following operations can be carried out.

MME may select P-GW for providing appropriate PDN connection to APN being connection-requested by UE. That is, according to the method for enabling MME to obtain P-GW information needed for MRA PDN connection creation, MME may select (e.g., H(e)NB1 co-located L-GW as shown in FIG. 11) for accessing the IPC capable entity connected to the home based network as P-GW, such that non-LIPA (or MRA) PDN connection for UE may be created.

In the above case (ii) or (iii) (i.e., the case in which a UE is camped on a macro cell or desires to receive the MRA service after being connected to another H(e)NB located outside of the home based network), at least one information indicating MRA service reception from among the following information pieces may be used when the UE transmits messages to the network (e.g., when the UE transmits an initial attach request, a PDN connection request, or messages transmitted for other procedures but not the PDN connection request, etc.).

L-GW information (e.g., address, ID, etc.) for accessing the IP capable entity connected to the home based network Indication information for explicitly describing MRA service intention.

However, inclusion information indicating that the UE receives the MRA service is not limited to the above-mentioned examples. MME may recognize the intention for providing the MRA service to the UE on the basis of the above-mentioned information, and may select an appropriate P-GW on the basis of the above method for enabling MME to obtain P-GW information needed for MRA PDN connection creation.

Although the P-GW selection scheme described in the above examples exemplarily discloses that MME is selected as P-GW for convenience of description and better understanding of the present invention, the scope or spirit of the present invention is not limited thereto, and the same principles may also be applied to the selection scheme of P-GW or GGSN.

Although the 3GPP Release-10 system shown in FIG. 3 has considered only the specific structure in which L-GW is co-located with H(e)NB for convenience of description, the scope or spirit of the present invention is not limited thereto. That is, the principles of the present invention can also be equally applied to the structure (i.e., standalone L-GW) in which L-GW is co-located with H(e)NB. In case of the standalone L-GW structure, H(e)NB may provide MME (or SGSN) with an address of L-GW serving the H(e)NB in the same manner as in the co-located L-GW structure. Alternatively, MME (or SGSN) may provide other information through which MME (or SGSN) can derive L-GW, instead of providing an address of L-GW serving H(e)NB. For example, the other information may be specific information for using ID or DNS of a local H(e)NB network including H(e)NB and L-GW. As a result, if it is necessary for MME (or SGSN) to create LIPA PDN connection, an appropriate L-GW may be selected as a gateway node. In addition, in case of the standalone L-GW structure, the appropriate L-GW may be selected as the gateway node for the MRA service according to the method for allowing MME to obtain P-GW information needed for MRA PDN connection creation. 'H(e)NB co-located L-GW' and 'standalone L-GW' are generically named 'H(e)NB associated L-GW'.

In addition, exemplary procedures for use in the P-GW selection scheme according to the present invention include only requisite procedures so as to provide the MRA service proposed by the present invention, and other procedures (for example, if APN is irrelevant to LIPA, and if APN is LIPA-only APN) to be performed during P-GW selection may be carried out according to the conventional art.

Figure 14:
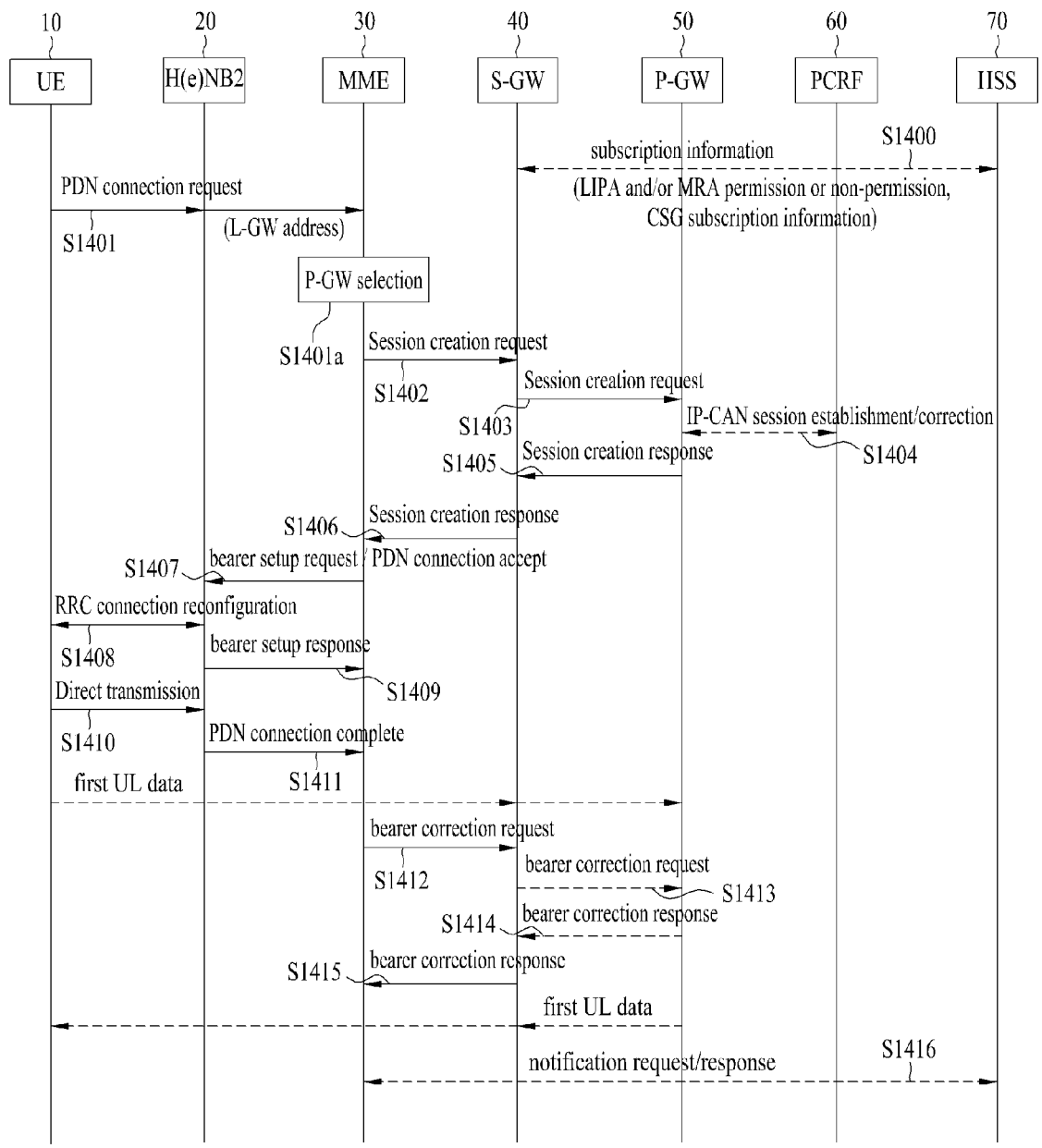
FIG. 14 is a flowchart illustrating a gateway selection method according to an embodiment.

FIG. 14 is a flowchart illustrating a gateway selection method according to an embodiment.

For clarity of description, FIG. 14 depicts the exemplary case in which the gateway selection operation proposed by the present invention is applied to the UE-requested PDN connectivity procedure. However, the scope or spirit of the present invention is not limited thereto, and the exemplary case of FIG. 14 can be applied as a gateway selection method to general procedures such as TAU (Tracking Area Update) or initial attach request.

The first example shown in FIG. 14 will hereinafter be described on the basis of the following assumptions.

MRA APN is not operated separately from LIPA APN.
HeNB (hereinafter referred to as HeNB1) connected to the home based network being connection-desired by UE can provide necessary services to CSG ID#1.
UE-connected HeNB (hereinafter referred to as HeNB2) can provide necessary services to CSG ID#2.
HeNB1 is co-located with L-GW (hereinafter referred to as L-GW#1) so as to provide the LIPA function.
HeNB2 is co-located with L-GW#2 so as to provide the LIPA function.
APN for accessing the network connected to HeNB1 is referred to as APN#1.
APN for accessing the network connected to HeNB2 is referred to as APN#2.

In the first example of FIG. 14, the UE desires to receive the MRA service associated with the home based network through other H(e)NB instead of H(e)NB connected to the home based network to be accessed. That is, after the UE connects to H(e)NB2, the UE attempts to access the IP capable entity contained in the home based network connected to HeNB 1. Since this example assumes that MRA APN is not operated separately from LIPA APN, APN#1 and APN#2 may indicate the same APN (for example, APN="LIPA_APN")

In step S1400, it is assumed that MME 30 receives subscriber information of the corresponding UE 10 through the initial attach process. Subscriber information stored in HSS 70 may include LIPA and/or MRA permission or non-permission information for each APN, CSG subscription information, etc.

In step S1401, UE 10 transmits the PDN connection request message, so that the PDN connection process requested by the UE 10 may start operation. In this case, the PDN connection request message may include APN (i.e., APN#1) of the home based network desired to be connected by the UE. The PDN connection request message is applied to MME 30 through H(e)NB2 20 connected to the UE 10. In this case, HeNB2 20 is co-located with L-GW, the corresponding L-GW address (i.e., L-GW#2 address) is included so that the PDN connection request message can be applied to MME 30. In this case, if HeNB2 20 includes the PDN connection request message to the INITIAL UE MESSAGE and transmits the resultant INITIAL UE MESSAGE, an ID (i.e., CSG ID#2) of a CSG configured to receive a service from HeNB2 is also included. Alternatively, HeNB2 20 may previously or separately provide CSG ID information for service provision to the MME 30. For example, HeNB2 20 may also provide CSG ID information to MME 30 during the initial attach of the UE 10.

In step S1401a, MME 30 having received the PDN connection request message may perform P-GW selection on the basis of not only subscriber information but also information contained in the PDN connection request message.

MME 30 may examine permission or non-permission of LIPA and/or MRA of APN (i.e., APN#1) contained in the PDN connection request message. In this example, it is assumed that permission or non-permission of LIPA and/or MRA for APN#1 indicates LIPA-conditional. Accordingly, MME 30 can recognize that APN#1 can be accessed through LIPA and non-LIPA.

If APN#1 is LIPA-conditional APN, MME 30 may examine the presence or absence of CSG ID information received from HeNB2 20 serving a cell camped on by UE 10. If MME 30 has CSG ID (i.e., CSG ID#2) information of HeNB2 20, MME 30 may examine whether CSG (i.e., CSG ID#1) in which APN#1 being connection-requested by UE 10 is permitted (or included) is identical to CSG (i.e., CSG ID#2) served by HeNB2 20 connected to the UE 10 on the basis of CSG subscription information constructing the subscriber information.

If CSG ID (i.e., CSG#1) through which APN (i.e., APN#1) requested by the UE 10 is permitted (or included) is different from CSG ID (i.e., CSG ID#2) received from HeNB 20 connected to the UE 10, MME 30 may select P-GW for providing appropriate PDN connection for APN#1 but not L-GW (i.e., L-GW#2) that is co-located with HeNB2 20 connected to the UE 10. That is, on the basis of 'P-GW needed when MME creates MRA PDN connection', MME 30 may select L-GW (i.e., L-GW#1) for enabling the UE 10 to access the home based network connected to HeNB1, and may use the selected L-GW as P-GW 50.

In step S1402, MME 30 may assign the bearer ID, and transmit the create session request message to S-GW 40. PDN GW address contained in the create session request message may be an address of P-GW 50 (i.e., L-GW#1) selected in step S1401a.

General description of the remaining steps (S1403 to S1416) shown in the first example of FIG. 14 may refer to steps S1003 to S1016 shown in FIG. 10.

The above first example shown in FIG. 14 assumes that MRA APN is not operated separately from LIPA APN, and the following second example shows that MRA APN is operated separately from LIPA APN.

The second example shown in FIG. 14 will hereinafter be described on the basis of the following assumptions.

MRA APN is not operated separately from LIPA APN.
HeNB (hereinafter referred to as HeNB1) connected to the home based network being connection-desired by UE can provide necessary services to CSG ID#1.
UE-connected HeNB (hereinafter referred to as HeNB2) can provide necessary services to CSG ID#2.
HeNB1 is co-located with L-GW (hereinafter referred to as L-GW#1) so as to provide the LIPA function.
HeNB2 is co-located with L-GW#2 so as to provide the LIPA function.
APN for accessing the network connected to HeNB1 is referred to as APN#1.
APN for accessing the network connected to HeNB2 is referred to as APN#2.

In the second example of FIG. 14, the UE desires to receive the MRA service associated with the home based network through other H(e)NB instead of H(e)NB connected to the home based network to be accessed. That is, after the UE connects to H(e)NB2, the UE attempts to access the IP capable entity contained in the home based network connected to HeNB1.

In step S1400, it is assumed that MME 30 receives subscriber information of the corresponding UE 10 through the initial attach process. Subscriber information stored in HSS 70 may include LIPA and/or MRA permission or non-permission information for each APN, CSG subscription information, etc.

In step S1401, UE 10 transmits the PDN connection request message, so that the PDN connection process requested by the UE 10 may start operation. In this case, the PDN connection request message may include APN (i.e., APN#1) of the home based network desired to be connected by the UE. The PDN connection request message is applied to MME 30 through H(e)NB2 20 connected to the UE 10. In this case, HeNB2 20 is co-located with L-GW, the corresponding L-GW address (i.e., L-GW#2 address) is included so that the PDN connection request message can be applied to MME 30. In this case, if HeNB2 20 includes the PDN connection request message to the INITIAL UE MESSAGE and transmits the resultant INITIAL UE MESSAGE, an ID (i.e., CSG ID#2) of a CSG configured to receive a service from HeNB2 is also included. Alternatively, HeNB2 20 may previously or separately provide CSG ID information for service provision to the MME 30. For example, HeNB2 20 may also provide CSG ID information to MME 30 during the initial attach of the UE 10. However, if HeNB2 20 receives APN (i.e., MRA APN) for the MRA service included by the UE 10 in step S1401, HeNB2 20 may not provide an address of L-GW (i.e., L-GW#2) co-located with MME 30 and/or CSG ID served by HeNB2.

In step S1401a, MME 30 having received the PDN connection request message may perform P-GW selection on the basis of not only subscriber information but also information contained in the PDN connection request message.

Since APN (i.e., APN#1) contained in the PDN connection request message is identical to APN (i.e., MRA APN) for the MRA service, it is determined whether or not MRA is permitted. This example assumes that MRA permission or non-permission of APN#1 indicates MRA permission. Accordingly, MME 30 can recognize that APN#1 can be accessed through non-LIPA.

If APN#1 is APN for the MRA service, MME 30 may select L-GW (i.e., L-GW#1) for accessing the home based network in which the UE 10 is connected to HeNB1, according to "P-GW needed when MME generates MRA PDN connection", such that the selected L-GW is used as P-GW 50.

In the above case (ii) or (iii) (i.e., the case in which a UE is camped on a macro cell or desires to receive the MRA service after being connected to another H(e)NB located outside of the home based network), at least one information indicating MRA service reception from among the following information pieces may be used when the UE transmits messages to the network (e.g., when the UE transmits an initial attach request, a PDN connection request, or messages transmitted for other procedures but not the PDN connection request, etc.).

L-GW information (e.g., address, ID, etc.) for accessing the IP capable entity connected to the home based network Indication information for explicitly describing MRA service intention.

However, inclusion information indicating that the UE receives the MRA service is not limited to the above-mentioned examples. MME may recognize the intention for providing the MRA service to the UE on the basis of the above-mentioned information, and may select an appropriate P-GW on the basis of the above method for enabling MME to obtain P-GW information needed for MRA PDN connection creation.

In step S1402, MME 30 may assign the bearer ID, and may transmit the create session request message to S-GW 40. PDN GW address contained in the create session request message may be identical to an address (i.e., L-GW#1) of P-GW 50 selected in step S1401a.

General description of the remaining steps (S1403 to S1416) shown in the second example of FIG. 14 may refer to steps S1003 to S1016 shown in FIG. 10.

The gateway node selection method for the MRA service shown in the above-mentioned embodiments can also be applied to the case of UE handover. For example, there is a need to reselect the gateway node in a first case (e.g., handover scenario 1 or 2 of Embodiment 2) in which the UE is handed over from the same home based network as the IP capable entity to which UE can access, or in a second case (e.g., handover scenario 6 or 7 of Embodiment 2) in which the UE can access the IP capable entity located outside of the home based network, such that the gateway node selection scheme proposed by the present invention may be used.

In accordance with the gateway node selection method shown in the above-mentioned examples, in case of MRA PDN connection request via a macro cell or via another H(e)NB, the UE correctly selects a gateway node for a home based network desired to be connected by the UE, a method for correctly and efficiently supporting the MRA service in various cases may be provided.

Figure 15:
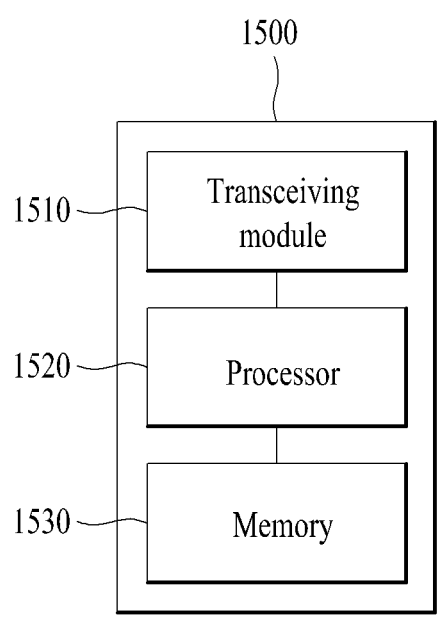
FIG. 15 is a block diagram illustrating a transceiver apparatus applicable to embodiments of the present invention.

The above described various embodiments of the present invention may be independently applied or two or more embodiments thereof may be simultaneously applied. FIG. 15 illustrates a configuration of a transceiver according to an embodiment of the present invention.

Referring to FIG. 15, a transceiver device 1500 according to an embodiment of the present invention may include a transceiver module 1510, a processor 1520, and a memory 1530. The transceiver module 1510 may be configured to transmit various signals, data and information to an external device, and may also be configured to receive various signals, data and information from the external device. The transceiver device 1500 may be connected to an external device by wire or wirelessly. The processor 1520 may control overall operation of the transceiver device 1500, and may be configured to execute a function of processing information communicated between the transceiver device 1500 and the external device. The memory 1530 may store the processed information for a predetermined time and may be replaced by a component such as a buffer (not shown).

The transceiver device 1500 according to the embodiment may be configured to transmit remote access indication information (or MRA PDN connection indication information). The processor 1520 of the transceiver device 1500 may be configured to generate remote access PDN connection indication information of UE PDN connection. In addition, the processor 1520 of the transceiver 1500 may be configured to transmit remote access PDN connection indication information to the UE through the transceiver module 1510. In this case, remote access PDN connection indication information may indicate whether PDN connection is remote access PDN connection. In addition, the processor 1520 of the transceiver device 1500 may allow the transceiver module 1510 to transmit remote access PDN connection indication information to the PDN gateway node via the serving gateway node.

The transceiver device 1500 according to another example of the present invention may be configured to receive remote access indication information. The processor 1520 of the transceiver device 1500 may be configured to receive remote access PDN connection indication information indicating whether UE PDN connection is remote access PDN connection from the first network node (e.g., MME) via the transceiver module. In this case, the remote access PDN connection indication information may be generated from the first network node.

The transceiver device 1500 may be implemented such that the above-described embodiments of the invention can be independently applied thereto or two or more of the embodiments can be simultaneously applied thereto and descriptions of redundant parts are omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The above-mentioned embodiments can be applied to various mobile communication systems.

The invention claimed is:

1. A method for transmitting managed remote access (MRA) indication information, the method comprising:
generating MRA packet data network (PDN) connection indication information regarding a PDN connection of a user equipment (UE) in a first network node; and
transmitting the MRA PDN connection indication information from the first network node to the UE,
wherein the MRA PDN connection indication information indicates whether the UE PDN connection is a MRA PDN connection and indicates handover type, wherein the handover type includes handover from one of type A, B or C to one of the type A, B or C, the type A is H(e)NB connected to a home based network, the type B is (e)NB not connected to the home based network, and the type C is H(e)NB not connected to the home based network, wherein the UE has LIPA(Local Internet Protocol Access) PDN connection when the UE performs handover from the type A and the UE has MRA PDN connection when the UE performs handover from the type B or type C, and
wherein whether the MRA PDN connection is permitted is defined according to whether LIPA is permitted.

2. The method according to claim 1, wherein the MRA PDN connection indication information further includes information on at least one of a type of MRA PDN connection or a type of a handover of the UE.

3. The method according to claim 1, wherein the MRA PDN connection indication information is defined as charging-related information for identifying the MRA PDN connection.

4. The method according to claim 1, further comprising:
transmitting the MRA PDN connection indication information from the first network node to a PDN gateway node through a serving gateway node.

5. The method according to claim 4, wherein, through the PDN gateway node, a charging system applied to the MRA PDN connection is determined on the basis of the MRA PDN connection indication information.

6. The method according to claim 1, wherein the MRA PDN connection indication information transmitted to the UE is defined as specific information indicating a connectivity type selected for the UE PDN connection.

7. The method according to claim 1, wherein whether a data session of the UE PDN connection is maintained during a handover of the UE is determined on the basis of the handover type included in the MRA PDN connection indication information.

8. The method according to claim 1, wherein information on whether a MRA PDN connection for the UE is permitted is provided to the first network node by a database.

9. The method according to claim 8, wherein the information on whether the MRA PDN connection is permitted is defined based on at least one of a network in which a subscriber is located, a network in which the UE is located, or a target network of the MRA PDN connection.

10. The method according to claim 8,
wherein the database is a network node for storing and managing at least one of subscriber information of the UE, Closed Subscriber Group (CSG) information, or group information for the MRA PDN connection; and
wherein the information on whether the MRA PDN connection is permitted is contained in at least one of the subscriber information, the CSG information, or the MRA PDN connection group information.

11. The method according to claim 1, wherein the first network node is a Mobility Management Entity (MME).

12. A method for receiving managed remote access (MRA) indication information, the method comprising:
receiving MRA packet data network (PDN) connection indication information indicating whether a PDN connection of a user equipment (UE) is a MRA PDN connection and indicating handover type, wherein the handover type includes handover from one of type A, B or C to one of the type A, B or C, the type A is H(e)NB connected to a home based network, the type B is (e)NB not connected to the home based network, and the type C is H(e)NB not connected to the home based network, wherein the UE has LIPA(Local Internet Protocol Access) PDN connection when the UE performs handover from the type A and the UE has MRA PDN connection when the UE performs handover from the type B or C from a first network node, wherein the MRA PDN connection indication information is generated in the first network node.

13. An apparatus for transmitting managed remote access (MRA) indication information, the apparatus comprising:
a transceiver module configured to transmit or receive a signal to or from an external part; and
a processor configured to control the transceiver module, wherein the processor is further configured to:
generate MRA packet data network (PDN) connection indication information regarding a PDN connection of a user equipment (UE), and
transmit the MRA PDN connection indication information to the UE through the transceiver module, and
wherein the MRA PDN connection indication information indicates whether the UE PDN connection is a MRA PDN connection and indicates handover type, wherein the handover type includes handover from one of type A, B or C to one of the type A, B or C, the type A is H(e)NB connected to a home based network, the type B is (e)NB not connected to the home based network, and the type C is H(e)NB not connected to the home based network, wherein the UE has LIPA(Local Internet Protocol Access) PDN connection when the UE performs handover from the type A and the UE has MRA PDN connection when the UE performs handover from the type B or C.

14. An apparatus for receiving managed remote access (MRA) indication information, the apparatus comprising:
a transceiver module configured to transmit or receive a signal to or from an external part; and
a processor configured to control the transceiver module, wherein the processor is further configured to receive MRA packet data network (PDN) connection indication information indicating whether a PDN connection of a user equipment (UE) is a MRA PDN connection and indicating handover type, wherein the handover type includes handover from one of t A B or C to one of the t A B or C the t A is H e NB connected to a home based network, the type B is (e)NB not connected to the home based network, and the type C is H(e)NB not connected to the home based network, wherein the UE has LIPA(Local Internet Protocol Access) PDN connection when the UE performs handover from the type A and the UE has MRA PDN connection when the UE performs handover from the type B or C from a first network node through the transceiver module, and
wherein the MRA PDN connection indication information is generated in the first network node.

15. The method according to claim 1, wherein the MRA PDN connection corresponds to a PDN connection between the UE that is located out of a home based network and a local server that is located in the home based network.

16. The method according to claim 12, wherein whether the MRA PDN connection is permitted is defined according to whether LIPA is permitted.

17. The apparatus according to claim 13, wherein whether the MRA PDN connection is permitted is defined according to whether LIPA is permitted.

18. The apparatus according to claim 14, wherein whether the MRA PDN connection is permitted is defined according to whether LIPA is permitted.

* * * * *